US012713389B2

(12) United States Patent
Thomas et al.

(10) Patent No.: US 12,713,389 B2
(45) Date of Patent: Aug. 18, 2026

(54) SIDELINK RANGING FOR POSITIONING REFERENCE SIGNAL TYPES

(71) Applicant: Lenovo (Singapore) Pte. Ltd., New Tech Park (SG)

(72) Inventors: Robin Thomas, Frankfurt am Main (DE); Karthikeyan Ganesan, Kronberg im Taunus (DE); Ankit Bhamri, Rödermark (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 306 days.

(21) Appl. No.: 18/548,053

(22) PCT Filed: Feb. 25, 2022

(86) PCT No.: PCT/IB2022/051694

§ 371 (c)(1),
(2) Date: Aug. 25, 2023

(87) PCT Pub. No.: WO2022/180599

PCT Pub. Date: Sep. 1, 2022

(65) Prior Publication Data

US 2024/0137906 A1 Apr. 25, 2024
US 2024/0236933 A9 Jul. 11, 2024

Related U.S. Application Data

(60) Provisional application No. 63/153,809, filed on Feb. 25, 2021.

(51) Int. Cl.
*H04W 64/00* (2009.01)
*H04W 48/16* (2009.01)
(Continued)

(52) U.S. Cl.
CPC ......... *H04W 64/006* (2013.01); *H04W 48/16* (2013.01); *H04W 76/10* (2018.02); *H04W 92/18* (2013.01)

(58) Field of Classification Search
CPC ... H04W 64/006; H04W 48/16; H04W 76/10; H04W 92/18; H04W 4/90; H04W 4/029; H04W 76/14; H04W 64/00; H04W 4/023
See application file for complete search history.

(56) References Cited

U.S. PATENT DOCUMENTS 9,439,039 B1 9/2016 Patil et al.
2016/0095080 A1 3/2016 Khoryaev et al.
2025/0168685 A1* 5/2025 Taghizadeh Motlagh .................. H04W 24/10

FOREIGN PATENT DOCUMENTS

CN 110663284 A 1/2020
CN 112205008 A 1/2021
(Continued)

OTHER PUBLICATIONS

PCT/IB2022/051694, "International Search Report and the Written Opinion of the International Searching Authority, or the Declaration", International Searching Authority, Aug. 19, 2022, pp. 1-64.
(Continued)

*Primary Examiner* — Diane D Mizrahi
(74) *Attorney, Agent, or Firm* — Kunzler Needham Hilton

(57) ABSTRACT

Various aspects of the present disclosure relate to sidelink ranging for positioning reference signal types. One apparatus includes at least one memory and at least one processor that is configured to receive a ranging request to initiate a sidelink ranging session along a sidelink connection, transmit a sidelink request message comprising a request to perform ranging setup and participate in the sidelink ranging session, initiate the sidelink ranging session in response to receiving a confirmation to participate in the sidelink rang-
(Continued)

ing session, determine completion of the sidelink ranging session, transmit a final ranging round message indicating a final round of the sidelink ranging session, and receive a location measurement report in response to the final ranging round message.

20 Claims, 15 Drawing Sheets

(51) Int. Cl.
*H04W 76/10* (2018.01)
*H04W 92/18* (2009.01)

(56) References Cited

FOREIGN PATENT DOCUMENTS

| | | | |
|---|---|---|---|
| EP | 3481139 | A1 | 5/2019 |
| WO | 2017027450 | A1 | 2/2017 |
| WO | 2019036578 | A1 | 2/2019 |
| WO | 2019190519 | A1 | 10/2019 |
| WO | 2020198616 | A1 | 10/2020 |

OTHER PUBLICATIONS

LG Electronics et al., "New SID: Study on use cases, scenarios, and requirements of sidelink positioning", 3GPP TSG RAN Meeting #88e RP-200859, Jun. 29-Jul. 3, 2020, pp. 1-4.
3GPP, "3rd Generation Partnership Project; Technical Specification Group Services and System Aspects; Study on enhancements for cyber-physical control applications in vertical domains; Stage 1 (Release 17)", 3GPP TR 22.832 V17.3.0, Sep. 2020, pp. 1-87.
3GPP, "3rd Generation Partnership Project; Technical Specification Group Services and System Aspects; Study on Ranging-based Services; Stage 1 (Release 18)", 3GPP TR 22.855 V0.2.0, Nov. 2020, pp. 1-36.
3GPP, "3rd Generation Partnership Project; Technical Specification Group Services and System Aspects; Location Services (LCS); Service description; Stage 1 (Release 16)", 3GPP TS 22.071 V16.0.0, Jul. 2020, pp. 1-55.
3GPP, "3rd Generation Partnership Project; Technical Specification Group Services and System Aspects; Service requirements for cyber-physical control applications in vertical domains; Stage 1 (Release 17)", 3GPP TS 22.104 V17.4.0, Sep. 2020, pp. 1-76.
3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.
3GPP, "3rd Generation Partnership Project; Technical Specification Group Services and System Aspects; Service requirements for the 5G system; Stage 1 (Release 18)", 3GPP TS 22.261 V18.1.1, Jan. 2021, pp. 1-85.
3GPP, "3rd Generation Partnership Project; Technical Specification Group Radio Access Network; LTE Positioning Protocol (LPP) (Release 16)", 3GPP TS 37.355 V16.3.0, Dec. 2020, pp. 1-298.
3GPP, "3rd Generation Partnership Project; Technical Specification Group Radio Access Network; NR; Physical channels and modulation (Release 16)", 3GPP TS 38.211 V16.4.0, Dec. 2020, pp. 1-133.
3GPP, "3rd Generation Partnership Project; Technical Specification Group Radio Access Network; NR; Physical layer measurements (Release 16)", 3GPP TS 38.215 V16.4.0, Dec. 2020, pp. 1-25.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.3.0, Dec. 2020, pp. 1-118.

* cited by examiner

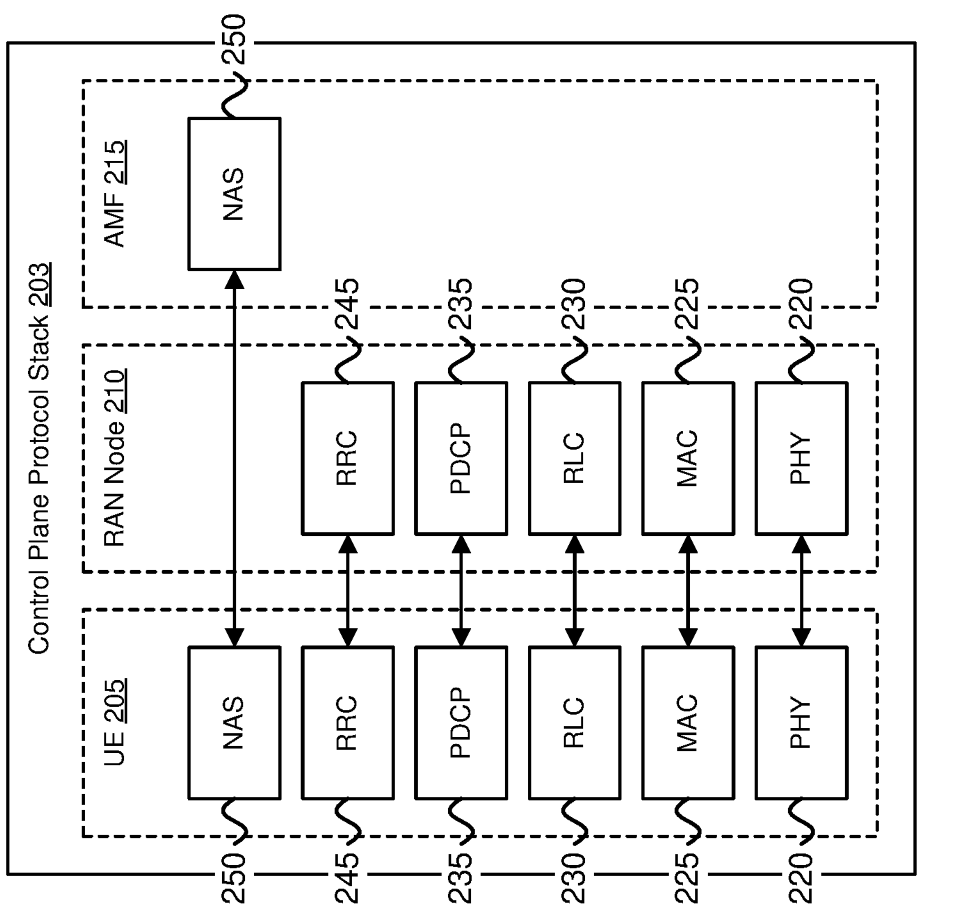
FIG. 2
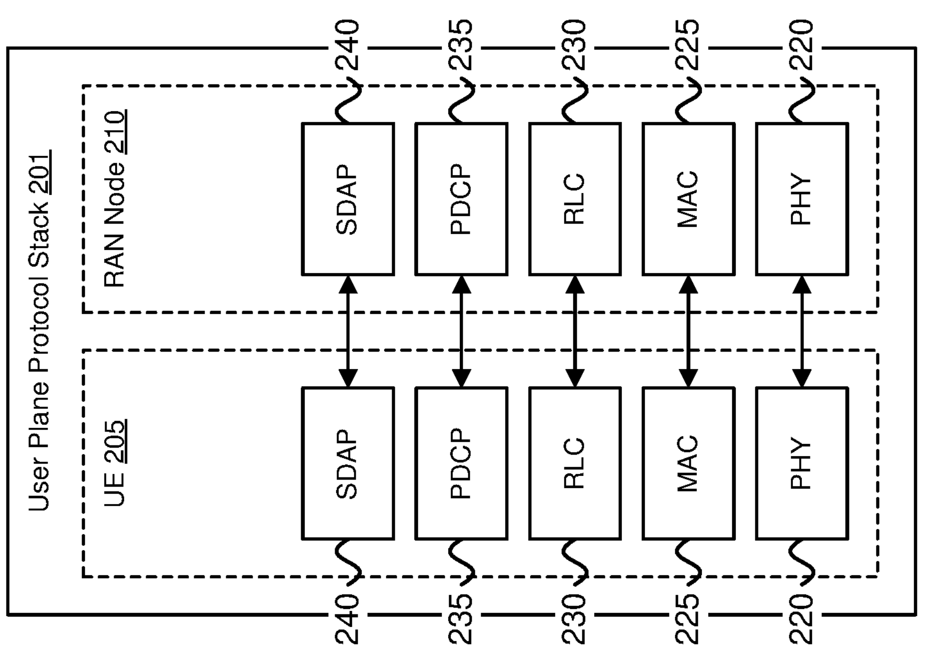

DL-TOA Assistance Data 700

```
-- ASN1START

NR-DL-TDOA-ProvideAssistanceData-r16 ::= SEQUENCE {
    nr-DL-PRS-AssistanceData-r16           NR-DL-PRS-AssistanceData-r16        OPTIONAL, -- Need ON
    nr-SelectedDL-PRS-IndexList-r16        NR-SelectedDL-PRS-IndexList-r16     OPTIONAL, -- Need ON
    nr-PositionCalculationAssistance-r16
                                           NR-PositionCalculationAssistance-r16
                                                                               OPTIONAL, -- Cond UEB
    nr-DL-TDOA-Error-r16                   NR-DL-TDOA-Error-r16                OPTIONAL, -- Need ON
    ...
}
-- ASN1STOP
```

FIG. 7A

DL-TOA Measurement Report 750

```
-- ASN1START

NR-DL-TDOA-SignalMeasurementInformation-r16 ::= SEQUENCE {
    dl-PRS-ReferenceInfo-r16     DL-PRS-IdInfo-r16,
    nr-DL-TDOA-MeasList-r16         NR-DL-TDOA-MeasList-r16,
    ...
}

NR-DL-TDOA-MeasList-r16 ::= SEQUENCE (SIZE(1..nrMaxTRPs-r16)) OF
                             NR-DL-TDOA-MeasElement-r16

NR-DL-TDOA-MeasElemnt-r16 ::= SEQUENCE {
    trp-ID-r16                   TRP-ID-r16,
    nr-DL-PRS-ResourceId-r16     NR-DL-PRS-ResourceId-r16               OPTIONAL,
    nr-DL-PRS-ResourceSetId-r16     NR-DL-PRS-ResourceSetId-r16         OPTIONAL,
    nr-TimeStamp-r16             NR-TimeStamp-r16,
    nr-RSTD-r16                      CHOICE {
            k0-r16                   INTEGER (0..1970049),
            k1-r16                   INTEGER (0..985025),
            k2-r16                   INTEGER (0..492513),
            k3-r16                   INTEGER (0..246257),
            k4-r16                   INTEGER (0..123129),
            k5-r16                   INTEGER (0..61565),
            ...
    },
    nr-AdditionalPathList-r16        NR-AdditionalPathList-r16          OPTIONAL,
    nr-TimingQuality-r16         NR-TimingQuality-r16,
    nr-DL-PRS-RSRP-Result-r16        INTEGER (0..126)                   OPTIONAL,
    nr-DL-TDOA-AdditionalMeasurements-r16
                                 NR-DL-TDOA-AdditionalMeasurements-r16     OPTIONAL,
    ...
}

NR-DL-TDOA-AdditionalMeasurements-r16 ::= SEQUENCE (SIZE (1..3)) OF
                                          NR-DL-TDOA-AdditionalMeasurementElement-r16


NR-DL-TDOA-AdditionalMeasurementElement-r16 ::= SEQUENCE {
    nr-DL-PRS-ResourceId-r16     NR-DL-PRS-ResourceId-r16               OPTIONAL,
    nr-DL-PRS-ResourceSetId-r16     NR-DL-PRS-ResourceSetId-r16         OPTIONAL,
    nr-TimeStamp-r16             NR-TimeStamp-r16,
    nr-RSTD-ResultDiff-r16           CHOICE {
            k0-r16                   INTEGER (0..8191),
            k1-r16                   INTEGER (0..4095),
            k2-r16                   INTEGER (0..2047),
            k3-r16                   INTEGER (0..1023),
            k4-r16                   INTEGER (0..511),
            k5-r16                   INTEGER (0..255),
            ...
    },
    nr-TimingQuality-r16         NR-TimingQuality-r16,
    nr-DL-PRS-RSRP-ResultDiff-r16    INTEGER (0..61)                    OPTIONAL,
    nr-AdditionalPathList-r16        NR-AdditionalPathList-r16          OPTIONAL,
    ...
}

-- ASN1STOP
```

SIDELINK RANGING FOR POSITIONING REFERENCE SIGNAL TYPES

CROSS-REFERENCE TO RELATED APPLICATIONS

This application claims the benefit of U.S. Provisional Patent Application No. 63/153,809, entitled "SIDELINK OPERATIONAL RANGING PROCEDURES" and filed on Feb. 25, 2021, for Robin Thomas et al., which is incorporated herein by reference.

FIELD

The subject matter disclosed herein relates generally to wireless communications and more particularly relates to sidelink ranging for positioning reference signal types.

BACKGROUND

In certain wireless communication systems, although there exists a third-generation partnership project ("3GPP") positioning framework, which enables user equipment ("UE")-assisted and UE-based positioning methods, the key issue is the current lack of support for efficient UE-to-UE ranging determination, which is essential to support relative positioning applications across different vertical services.

BRIEF SUMMARY

Disclosed are procedures for sidelink ranging for positioning reference signal types. The procedures may be implemented by apparatus, systems, methods, or computer program products.

In one embodiment, a first apparatus includes a transceiver that receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the first apparatus includes a processor that initiates the sidelink ranging session with the responder device in response to receiving a confirmation that the responder device will participate in the sidelink ranging session and determines completion of the sidelink ranging session with the responder device. In one embodiment, the transceiver transmits, to the responder device, a final ranging round message to the responder device indicating a final round of the sidelink ranging session and receives, from the responder device, a location measurement report in response to the final ranging round message.

In one embodiment, a first method receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the first method initiates the sidelink ranging session with the responder device in response to receiving a confirmation that the responder device will participate in the sidelink ranging session and determines completion of the sidelink ranging session with the responder device. In one embodiment, the first method transmits, to the responder device, a final ranging round message to the responder device indicating a final round of the sidelink ranging session and receives, from the to responder device, a location measurement report in response to the final ranging round message.

In one embodiment, a second apparatus includes a transceiver that receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the second apparatus includes a processor that participates in the sidelink ranging session with the initiator device. In one embodiment, the transceiver receives, from the initiator device, a final ranging round message indicating a final round of the sidelink ranging session and transmits, to the initiator device, a location measurement report in response to the final ranging round message.

In one embodiment, a second method receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the second method participates in the sidelink ranging session with the initiator device. In one embodiment, the second method receives, from the initiator device, a final ranging round message indicating a final round of the sidelink ranging session and transmits, to the initiator device, a location measurement report in response to the final ranging round message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of a 5G New Radio ("NR") protocol stack;

FIG. 7A is one embodiment of DL-TDOA assistance data;

FIG. 7B is one embodiment of DL-TDOA measurement report;

FIG. 8B is a diagram illustrating one embodiment of groupcast ranging setup procedures;

DETAILED DESCRIPTION

Figure 1:
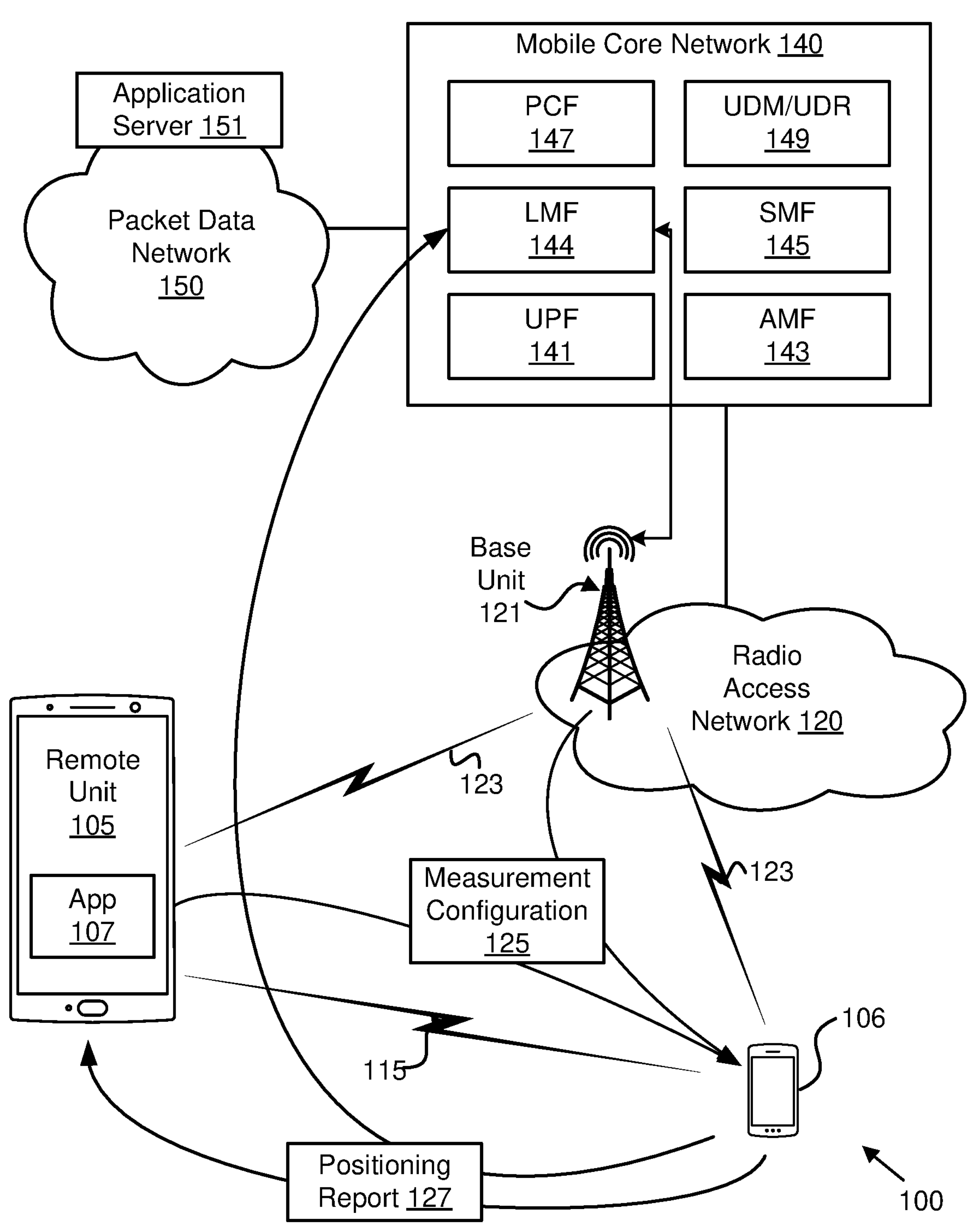
FIG. 1 is a schematic block diagram illustrating one embodiment of a wireless communication system for sidelink ranging for positioning reference signal types.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams. The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for sidelink ranging for positioning reference signal types. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Although there exists a 3GPP positioning framework, which enables UE-assisted and UE-based positioning methods, the key issue is the current lack of support for efficient UE-to-UE ranging determination, which is essential to support relative positioning applications across different vertical services, e.g., vehicle to everything ("V2X"), public safety, industrial internet of things ("IIoT"), commercial, and/or the like. In one embodiment, the present disclosure provides the operational procedures for triggering ranging using different PRS Types along the sidelink ("SL") based on a set of ranging service levels and/or ranging discovery mechanisms. Each PRS Type offers the capability of providing enhanced accuracy for determining the range and orientation between a pair of UEs and/or multiple pair of UEs in a group. In one embodiment, the present disclosure describes the operational signaling framework to enable ranging on the sidelink.

In the solutions proposed herein, a list of network and UE triggered ranging requests are detailed to enable different scenarios for initiating a ranging session, a novel set of operating procedures including setup and closing procedures are described for sidelink in order to enable efficient ranging procedures from application level to the physical layer, a ranging QoS/service level is defined to signal the ranging requirements towards the lower layers to trigger an appropriate ranging session to meet the allocated ranging requirements, and ranging discovery methods are proposed based on two types discovery mechanisms, which enable open and restricted ranging sessions.

FIG. 1 depicts a wireless communication system 100 for sidelink ranging for positioning reference signal types, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals.

Furthermore, the UL and DL communication signals may be carried over the wireless communication links 123. Here, the RAN 120 is an intermediate network that provides the remote units 105 with access to the mobile core network 140. As described in greater detail below, the base unit(s) 121 may provide a cell operating using a first frequency range and/or a cell operating using a second frequency range.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

To establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, e.g., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (e.g., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Location Management Function ("LMF") 144, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (e.g., session establishment, modification, release), remote unit (e.g., UE) IP address allocation & management, DL data notification, and traffic steering configuration of the UPF 141 for proper traffic routing.

The LMF 144 receives positioning measurements or estimates from RAN 120 and the remote unit 105 (e.g., via the AMF 143) and computes the position of the remote unit 105. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Policy Control Function ("PCF") (which provides policy rules to CP functions), a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

As discussed in greater detail below, the remote unit 105 may be an initiator device and transmits a positioning measurement configuration 125 to a responder device 106. In some embodiments, the initiator device may be a base unit 121, e.g., a gNB. In one embodiment, the initiator device receives a positioning/measurement report 127 from the responder device 106. In one embodiment, the initiator device sends the measurement configuration, and/or other configurations, and receives the positioning report 127 over a sidelink connection 115 between the initiator device and the responder device 106. As used herein, a sidelink connection 115 allows remote units 105 to communicate directly with each other (e.g., device-to-device communication) using sidelink (e.g., V2X communication) signals.

While FIG. 1 depicts components of a 5G RAN and a 5G core network, the described embodiments for sidelink ranging for positioning reference signal types apply to other types of communication networks and RATs, including IEEE 802.11 variants, Global System for Mobile Communications ("GSM", e.g., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the proposed solutions/methods are also equally applicable to other mobile communication systems supporting sidelink ranging for positioning reference signal types.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, for Release 17 ("Rel-17") of the 3GPP specification, the different positioning requirements are especially stringent with respect to accuracy, latency, and reliability. Table 1 shows positioning performance requirements for different scenarios in an Industrial IoT ("IIoT") or indoor factory setting.

TABLE 1

IIoT Positioning Performance Requirements

| Scenario | Horizontal accuracy | Vertical accuracy | Availability | Latency for position estimation of UE | UE Speed | Corresponding Positioning Service Level |
|---|---|---|---|---|---|---|
| Mobile control panels with safety functions (non-danger zones) | <5 m | <3 m | 90% | <5 s | N/A | Service Level 2 |
| Process automation - plant asset management | <1 m | <3 m | 90% | <2 s | <30 km/h | Service Level 3 |
| Flexible, modular assembly area in smart factories (for tracking of tools at the work-place location) | <1 m (relative positioning) | N/A | 99% | 1 s | <30 km/h | Service Level 3 |
| Augmented reality in smart factories | <1 m | <3 m | 99% | <15 ms | <10 km/h | Service Level 4 |
| Mobile control panels with safety functions in smart factories (within factory danger zones) | <1 m | <3 m | 99.9% | <1 s | N/A | Service Level 4 |
| Flexible, modular assembly area in smart factories (for autonomous vehicles, only for monitoring proposes) | <50 cm | <3 m | 99% | 1 s | <30 km/h | Service Level 5 |
| Inbound logistics for manufacturing (for driving trajectories (if supported by further sensors like camera, GNSS, IMU) of indoor autonomous driving systems)) | <30 cm (if supported by further sensors like camera, GNSS, IMU) | <3 m | 99.9% | 10 ms | <30 km/h | Service Level 6 |
| Inbound logistics for manufacturing (for storage of goods) | <20 cm | <20 cm | 99% | <1 s | <30 km/h | Service Level 7 |

Some UE positioning techniques supported in Rel-16 are listed in Table 2. The separate positioning techniques as indicated in Table 2 may be currently configured and performed based on the requirements of the LMF and/or UE capabilities. Note that Table 2 includes TBS positioning based on PRS signals, but only observed time difference of arrival ("OTDOA") based on LTE signals is supported. The E-CID includes Cell-ID for NR method. The Terrestrial Beacon System ("TBS") method refers to TBS positioning based on Metropolitan Beacon System ("MBS") signals.

TABLE 2

Supported Rel-16 UE positioning methods

| Method | UE-based | UE-assisted LMF-based | NG-RAN node assisted | Secure User Plane Location ("SUPL") |
|---|---|---|---|---|
| A-GNSS | Yes | Yes | No | Yes (UE-based and UE-assisted) |
| OTDOA | No | Yes | No | Yes (UE-assisted) |
| E-CID | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

The transmission of PRS enable the UE to perform UE positioning-related measurements to enable the computation of a UE's location estimate and are configured per Transmission Reception Point ("TRP"), where a TRP may transmit one or more beams.

Figure 3:
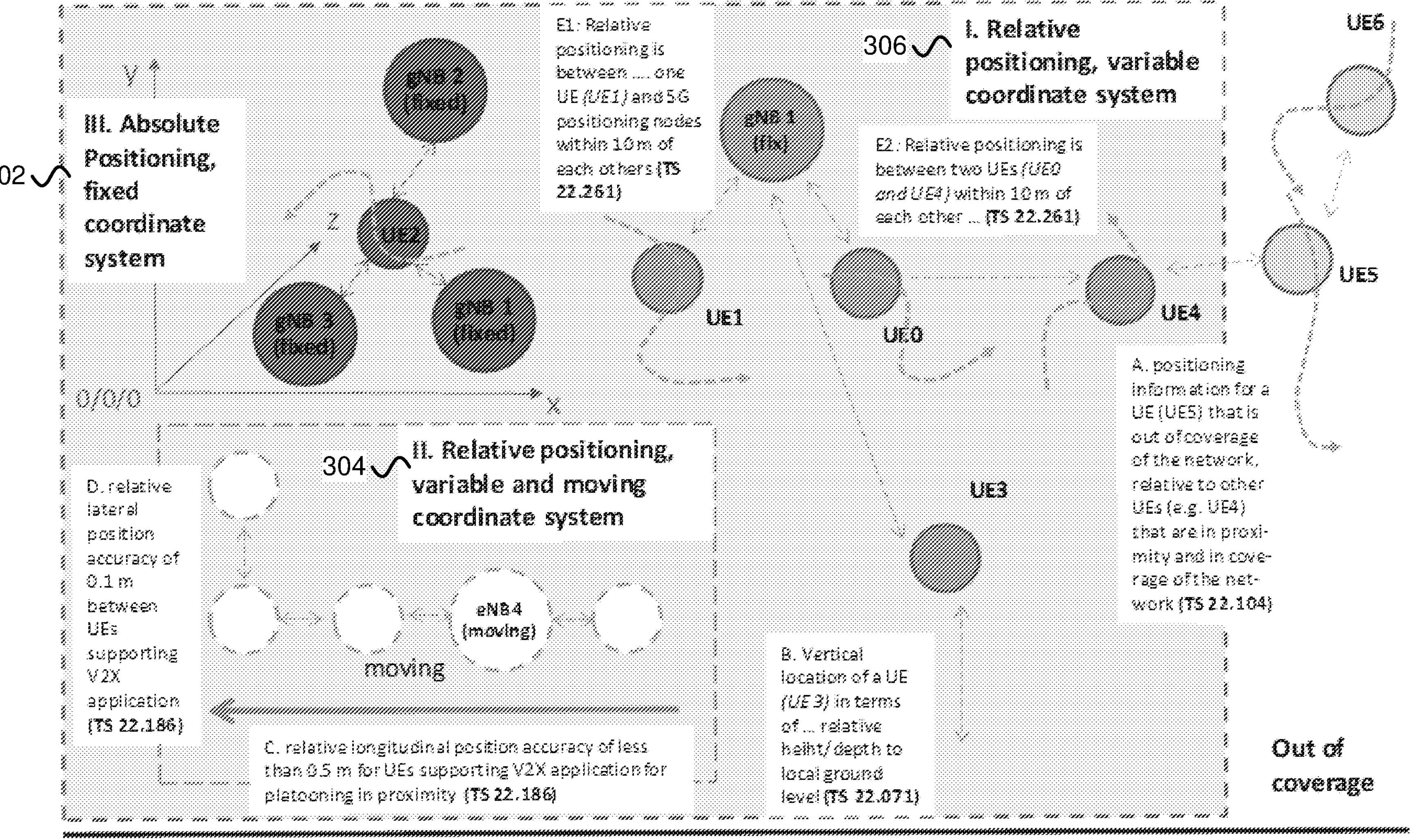
FIG. 3 is a diagram depicting an overview on absolute and relative positioning as defined in Stage 1 specifications.

FIG. 3 depicts one an overview of one embodiment of the absolute and relative positioning scenarios as defined in the architectural (stage 1) specifications using three different co-ordinate systems: Absolute Positioning, fixed coordinate systems 302; Relative Positioning, variable and moving coordinate system 304; and Relative Positioning, variable coordinate system 306.

In one embodiment, the following RAT-dependent positioning techniques may be supported by the system 100:

DL-TDoA: The downlink time difference of arrival ("DL-TDOA") positioning method makes use of the DL RS Time Difference ("RSTD") (and optionally DL PRS RS Received Power ("RSRP") of DL PRS RS Received Quality ("RSRQ")) of downlink signals received from multiple TPs, at the UE (e.g., remote unit 105). The UE measures the DL RSTD (and optionally DL PRS RSRP) of the received signals using assistance data received from the positioning server, and the resulting measurements are used along with other configuration information to locate the UE in relation to the neighboring Transmission Points ("TPs").

DL-AoD: The DL Angle of Departure ("AoD") positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighboring TPs.

Figure 4:
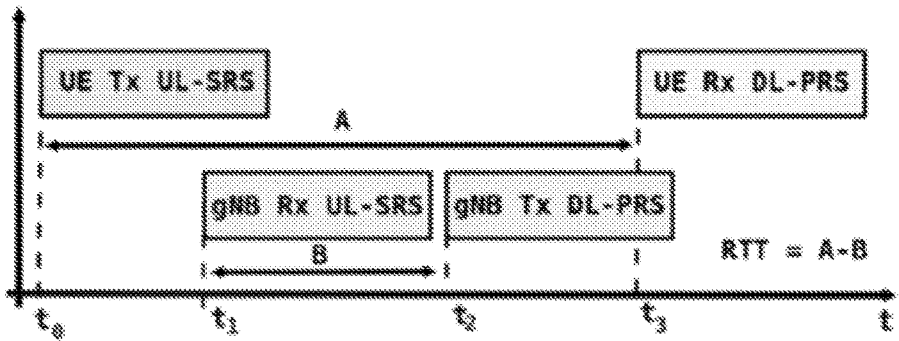
FIG. 4 is a diagram illustrating one embodiment of a Multi-Cell RTT procedure.

Multi-RTT: The Multiple-Round Trip Time ("Multi-RTT") positioning method makes use of the UE Receive-Transmit ("Rx-Tx") measurements and DL PRS RSRP of downlink signals received from multiple TRPs, measured by the UE and the gNB Rx-Tx measurements (e.g., measured by RAN node) and UL SRS-RSRP at multiple TRPs of uplink signals transmitted from UE, as shown in FIG. 4.

Figure 5:
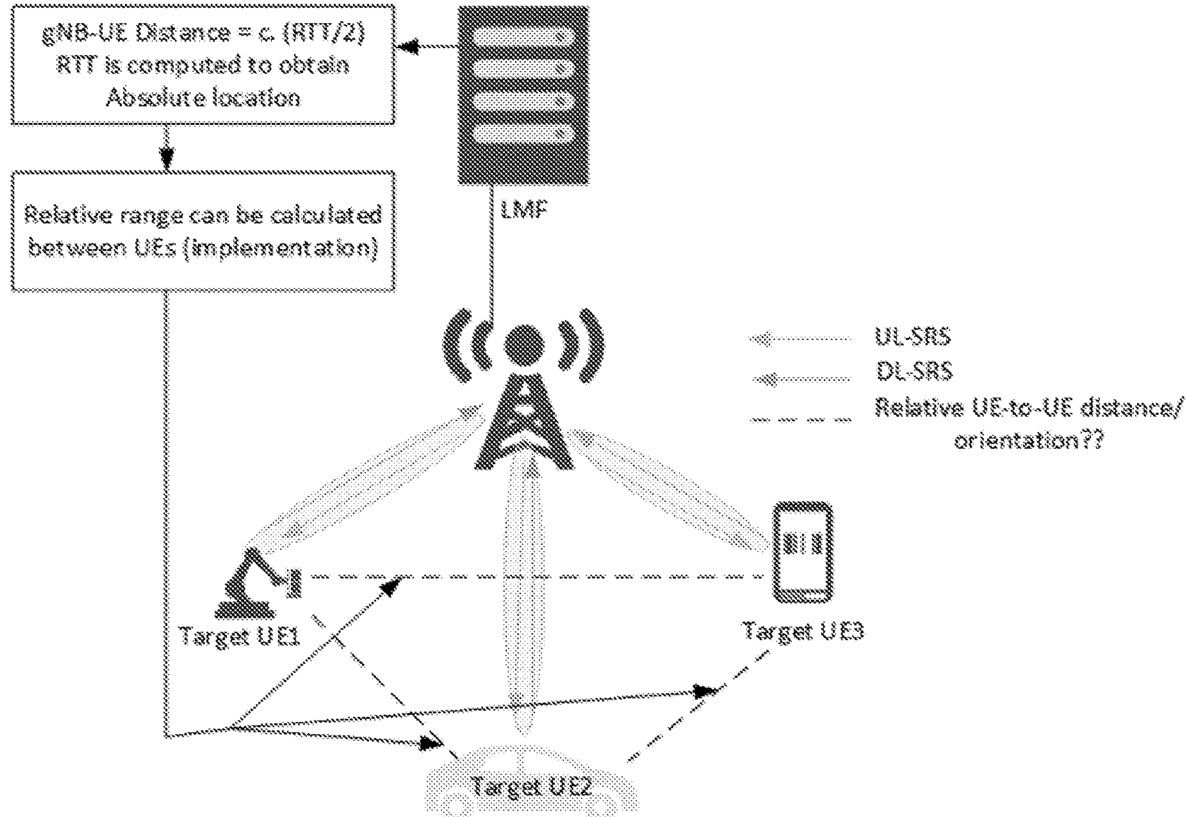
FIG. 5 is a diagram illustrating one embodiment of relative range estimation using the existing single gNB RTT positioning framework.

As shown in FIG. 5, the UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the Round Trip Time ("RTT") at the positioning server which are used to estimate the location of the UE. In one embodiment, Multi-RTT is only supported for UE-assisted/NG-RAN assisted positioning techniques, as noted in Table 2.

E-CID/NR E-CID: Enhanced Cell ID ("CID") positioning method, the position of a UE is estimated with the knowledge of its serving ng-eNB, gNB and cell and is based on LTE signals. The information about the serving ng-eNB, gNB and cell may be obtained by paging, registration, or other methods. NR Enhanced Cell ID ("NR E-CID") positioning refers to techniques which use additional UE measurements and/or NR radio resource and other measurements to improve the UE location estimate using NR signals.

Although NR E-CID positioning may utilize some of the same measurements as the measurement control system in the RRC protocol, the UE generally is not expected to make additional measurements for the sole purpose of positioning; e.g., the positioning procedures do not supply a measurement configuration or measurement control message, and the UE reports the measurements that it has available rather than being required to take additional measurement actions.

UL-TDoA: The UL TDOA positioning method makes use of the UL TDOA (and optionally UL SRS-RSRP) at multiple reception points ("RPs") of uplink signals transmitted from the UE. The RPs measure the UL TDOA (and optionally UL SRS-RSRP) of the received signals using assistance data received from the positioning server, and the resulting measurements are used along with other configuration information to estimate the location of the UE.

UL-AoA: The UL Angle of Arrival ("AoA") positioning method makes use of the measured azimuth and the zenith angles of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

Figure 6:
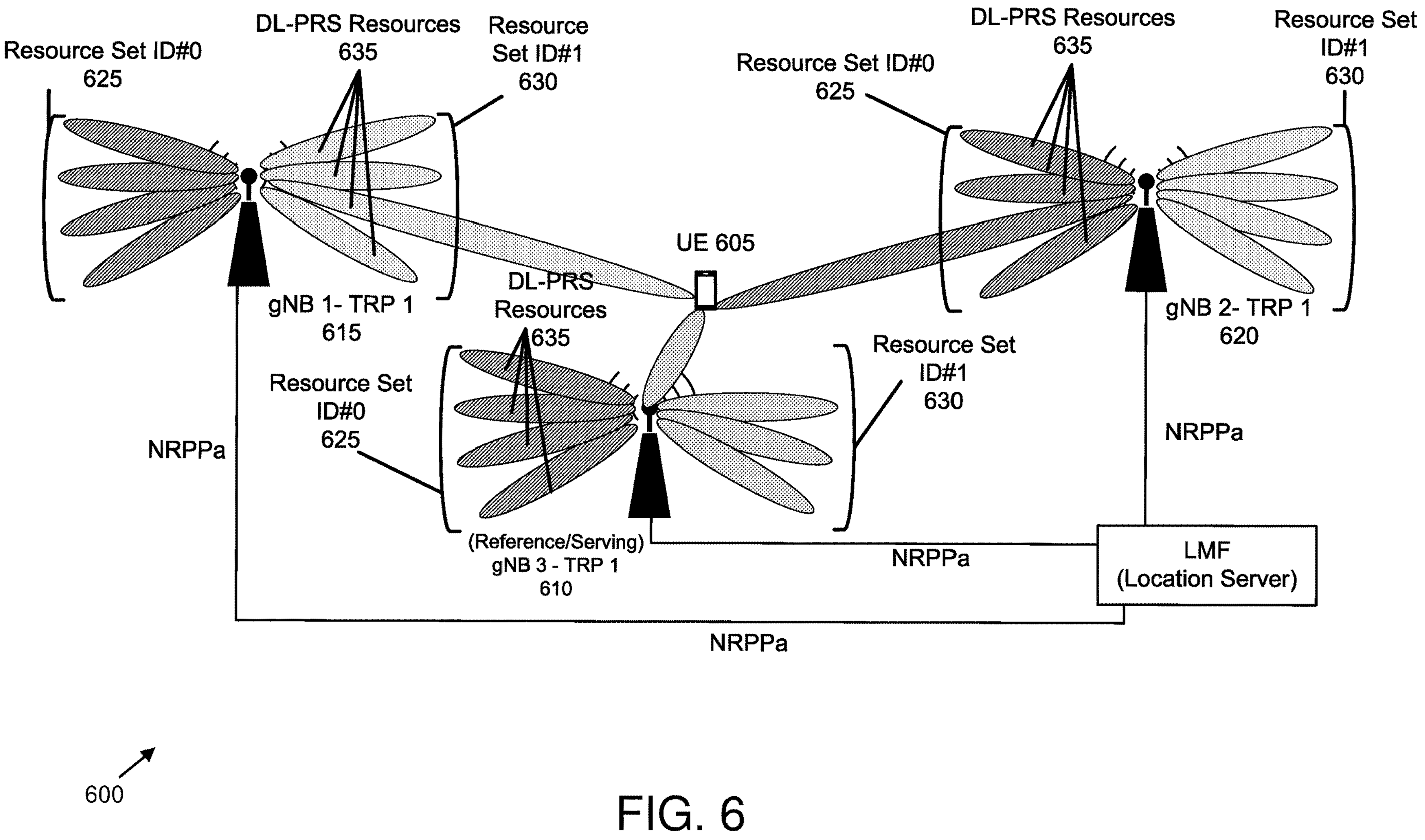
FIG. 6 is a diagram illustrating one embodiment of NR Beam-based positioning.

FIG. 6 depicts a system 600 for NR beam-based positioning. According to Rel-16, the PRS can be transmitted by different base stations (serving and neighboring) using narrow beams over Frequency Range #1 Between ("FR1", e.g., frequencies from 410 MHz to 7125 MHz) and Frequency Range #2 ("FR2", e.g., frequencies from 24.25 GHz to 52.6 GHz), which is relatively different when compared to LTE where the PRS was transmitted across the whole cell.

As illustrated in FIG. 6, a UE 605 may receive PRS from a first gNB ("gNB 3") 610, which is a serving gNB, and also from a neighboring second gNB ("gNB 1") 615, and a neighboring third gNB ("gNB 2") 620. Here, the PRS can be locally associated with a set of PRS Resources grouped under a Resource Set ID for a base station (e.g., TRP). In the depicted embodiments, each gNB 610, 615, 620 is configured with a first Resource Set ID 625 and a second Resource Set ID 630. As depicted, the UE 605 receives PRS on transmission beams; here, receiving PRS from the gNB 3 610 on a set of PRS Resources 635 from the second Resource Set ID 630, receiving PRS from the gNB 1 615 on a set of PRS Resources 635 from the second Resource Set ID 630, and receiving PRS from the gNB 2 620 on a set of PRS Resources 635 from the first Resource Set ID 625.

Similarly, UE positioning measurements such as Reference Signal Time Difference ("RSTD") and PRS RSRP measurements are made between beams as opposed to different cells as was the case in LTE. In addition, there are additional UL positioning methods for the network to exploit to compute the target UE's location. Table 3 lists the RS-to-measurements mapping required for each of the supported RAT-dependent positioning techniques at the UE, and Table 4 lists the RS-to-measurements mapping required for each of the supported RAT-dependent positioning techniques at the gNB.

TABLE 3

UE Measurements to enable RAT-dependent positioning techniques

| DL/UL Reference Signals | UE Measurements | To facilitate support of the following positioning techniques |
|---|---|---|
| Rel-16 DL PRS | DL RSTD | DL-TDOA |
| Rel-16 DL PRS | DL PRS RSRP | DL-TDOA, DL-AoD, Multi-RTT |
| Rel-16 DL PRS/Rel-16 SRS for positioning | UE Rx − Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM), SS-RSRPB (for RRM) | E-CID |

TABLE 4 gNB Measurements to enable RAT-dependent positioning techniques

| DL/UL Reference Signals | gNB Measurements | To facilitate support of the following positioning techniques |
|---|---|---|
| Rel-16 SRS for positioning | UL RTOA | UL-TDOA |
| Rel-16 SRS for positioning | UL SRS-RSRP | UL-TDOA, UL-AoA, Multi-RTT |
| Rel-16 SRS for positioning, Rel-16 DL PRS | gNB Rx − Tx time difference | Multi-RTT |
| Rel-16 SRS for positioning, | A-AoA and Z-AoA | UL-AoA, Multi-RTT |

According to TS38.215, UE measurements have been defined, which are applicable to DL-based positioning techniques (see subclause 2.4). For a conceptual overview of the current implementation in Rel-16, the DL-TDOA assistance data configurations (see FIG. 7A) and measurement reporting information (see FIG. 7B) are provided as illustrative examples. The IE NR-DL-TDOA-ProvideAssistanceData, shown in FIG. 7A, is used by the location server to provide assistance data to enable UE-assisted and UE-based NR downlink TDOA. It may also be used to provide NR DL TDOA positioning specific error reason.

The IE NR-DL-TDOA-SignalMeasurementInformation, shown in FIG. 7B, is used by the target device to provide NR-DL TDOA measurements to the location server. The measurements are provided as a list of TRPs, where the first TRP in the list is used as reference TRP in case RSTD measurements are reported. The first TRP in the list may or may not be the reference TRP indicated in the NR-DL-PRS-AssistanceData. Furthermore, the target device selects a reference resource per TRP, and compiles the measurements per TRP based on the selected reference resource.

The different DL measurements including DL PRS-RSRP, DL RSTD and UE Rx-Tx Time Difference required for the supported RAT-dependent positioning techniques are shown in Table 5. The following measurement configurations are specified, e.g., in TS 38.215:

i. 4 Pair of DL RSTD measurements can be performed per pair of cells. Each measurement is performed between a different pair of DL PRS Resources/Resource Sets with a single reference timing.

ii. 8 DL PRS RSRP measurements can be performed on different DL PRS resources from the same cell.

TABLE 1

DL Measurements required for DL-based positioning methods

| DL PRS reference signal received power (DL PRS-RSRP) | |
|---|---|
| Definition | DL PRS reference signal received power (DL PRS-RSRP), is defined as the linear average over the power contributions (in [W]) of the resource elements that carry DL PRS reference signals configured for RSRP measurements within the considered measurement frequency bandwidth.<br>For frequency range 1, the reference point for the DL PRS-RSRP shall be the antenna connector of the UE. For frequency range 2, DL PRS-RSRP shall be measured based on the combined signal from antenna elements corresponding to a given receiver branch. For frequency range 1 and 2, if receiver diversity is in use by the UE, the reported DL PRS-RSRP value shall not be lower than the corresponding DL PRS-RSRP of any of the individual receiver branches. |
| Applicable for | RRC_CONNECTED intra-frequency,<br>RRC_CONNECTED inter-frequency |

TABLE 1-continued

| DL Measurements required for DL-based positioning methods | |
|---|---|
| DL reference signal time difference (DL RSTD) | |
| Definition | DL reference signal time difference (DL RSTD) is the DL relative timing difference between the positioning node j and the reference positioning node i, defined as $T_{SubframeRxj} - T_{SubframeRxi}$,<br>Where:<br>$T_{SubframeRxj}$ is the time when the UE receives the start of one subframe from positioning node j.<br>$T_{SubframeRxi}$ is the time when the UE receives the corresponding start of one subframe from positioning node i that is closest in time to the subframe received from positioning node j.<br>Multiple DL PRS resources can be used to determine the start of one subframe from a positioning node.<br>For frequency range 1, the reference point for the DL RSTD shall be the antenna connector of the UE. For frequency range 2, the reference point for the DL RSTD shall be the antenna of the UE. |
| Applicable for | RRC_CONNECTED intra-frequency<br>RRC_CONNECTED inter-frequency |
| UE Rx − Tx time difference | |
| Definition | The UE Rx − Tx time difference is defined as $T_{UE-RX} - T_{UE-TX}$<br>Where:<br>$T_{UE-RX}$ is the UE received timing of downlink subframe #i from a positioning node, defined by the first detected path in time.<br>$T_{UE-TX}$ is the UE transmit timing of uplink subframe #j that is closest in time to the subframe #i received from the positioning node.<br>Multiple DL PRS resources can be used to determine the start of one subframe of the first arrival path of the positioning node.<br>For frequency range 1, the reference point for $T_{UE-RX}$ measurement shall be the Rx antenna connector of the UE and the reference point for $T_{UE-TX}$ measurement shall be the Tx antenna connector of the UE. For frequency range 2, the reference point for $T_{UE-RX}$ measurement shall be the Rx antenna of the UE and the reference point for $T_{UE-TX}$ measurement shall be the Tx antenna of the UE. |
| Applicable for | RRC_CONNECTED intra-frequency<br>RRC_CONNECTED inter-frequency |

In one embodiment, includes signaling solutions that detail the setup and closing procedures for performing enhanced RTT methods and relative orientation techniques using ranging signals based on different PRS Types, which can improve the accuracy of the ranging estimate. In one embodiment, the solutions presented herein include methods to enable different triggered ranging requests configurations from the LCS Client/Application level, which are defined from a network and UE perspective; methods to enable the signaling related to the setup activities and closing procedures related to a ranging session, which can be supported for unicast, groupcast, and/or broadcast ranging cast type modes; and methods to perform ranging discovery based on two models for a pair of UEs or group of responder devices in proximity to the initiator device.

It is noted that, as used herein, a controller refers to a device that controls the ranging session and defines the ranging parameters by sending the ranging control information; a controlee refers to a device that utilizes the ranging parameters received from the controller by decoding the ranging control message; an initiator device, following the transmission/reception of the ranging control message, transmits the first ranging message exchange; and a responder device responds to the initial ranging message received from the initiator.

Accordingly, in one embodiment, the solutions described herein provide triggered ranging requests enable the lower layers to enable ranging based on a particular ranging service level. The ranging service level framework is designed to meet the ranging accuracy, directional accuracy and latency of a ranging location service request. In one embodiment, the proposed solution describes setup and closing procedures can cater for unicast, groupcast and broadcast ranging sessions. In one embodiment, the ranging discovery methods enable dynamic group management for ranging based on ranging service discovery messages.

The following embodiments describe the procedures to enable ranging using a pulse-based waveform and enhanced two way ranging estimates. Hereafter, the considered ranging signals in this disclosure will be referred to as follows:

- PRS Type 1—Signals that use the pseudo random sequence design using, e.g., a gold sequence as outlined in TS 38.211.
- PRS Type 2—Signals that make use of a Zadoff-chu sequences with orthogonal cyclic shifts.
- PRS Type 3—Signals make use of a pulse-based waveform (e.g., root raised cosine pulse, sinc pulse) with a ≤2 ns pulse duration with a configured pulse repetition frequency transmitted over a wide bandwidth (e.g. 400 MHz).

Furthermore, PRS Type 1, PRS Type 2, and PRS Type 3 signals can be applicable to both the Uu and PC5 interfaces, although the scope of this disclosure primarily covers methods related to SL (PC5) interface.

A first embodiment describes the ranging requests that can be either triggered from the network or a UE. In one embodiment, the following relative location requests ("LR") are supported in the network to initiate ranging session:

- Network Induced Ranging Request ("NI-RR"): Refers to a ranging request that is initiated by a serving AMF for a target pair of UEs/set of UE pairs depending on a particular service (e.g., regulatory, or public safety).
- Mobile Terminated Ranging Request ("MT-RR"): Refers to a ranging request that is initiated by location services ("LCS") client, an application function ("AF"), or a V2X/ProSe Application Layer that may be external to or internal to a serving public land mobile network ("PLMN"). These entities can trigger a ranging request to the PLMN (which may be the home PLMN ("HPLMN") or visiting PLMN ("VPLMN")) for the range of a target pair of UEs.

Mobile Originated Ranging Request ("MO-RR"): Refers to a ranging request where the initiator UE triggers a request to a serving PLMN for relative location for a pair of target UEs.

Immediate Ranging Request ("I-RR"): Refers to a ranging request that an (external or internal) LCS client or Application function or V2X/ProSe Application Layer initiates or triggers for a target pair of UEs (or group of target UEs) and expects to receive a response containing relative location information for a pair of target UEs (or group pair of target UEs) within a short time period, which may be specified using a particular ranging service level or quality of service ("QoS"). An immediate relative location request may be used for an NI-RR, an MT-RR, or an MO-RR.

Deferred Ranging Request ("D-RR"): Refers to a ranging request where an LCS client, AF, or V2X/ProSe Application Layer initiates or triggers within a PLMN for a pair of target UEs (or group pair of target UEs) and expects to receive a response containing the indication of event occurrence and relative location information if requested for a pair of target UEs (or group pair of target UEs) at some future time (or times), which may be associated with specific events associated with the pair of target UEs (or group pair of target UEs). This may be supported for NI-RR, an MT-RR, or an MO-RR.

In the case of a D-RR, an event that may trigger such a ranging request may be based on:

Coverage area: This event is based on whether a pair or one of the pair of UEs enters, leaves, or remains within a pre-defined geographical area, which can be either in-coverage, partial coverage or out of coverage.

At least one type of area event can be defined (e.g., entering, leaving, or remaining within the area). The V2X/ProSe Application Layer or LCS client or application function may define the target area as a geographical area or as a geopolitical name of an area or based on predefined zones of configured lengths.

The relative location estimate or range estimate may be included in the report. If an area event is detected by the UE but an event report cannot be sent to the initiator or responder UE (e.g., because the UE cannot access the network or due to a minimum reporting interval), a deferred report can be transmitted at a later stage irrespective of whether the area event still applies for the current UE location.

Area event reporting is controlled by a minimum and a maximum reporting time. The minimum reporting time defines the minimum allowed time between successive area events. The maximum reporting time defines the maximum time between successive reports. When a UE transmits a report due to expiration of the maximum reporting time, the UE indicates expiration of the maximum reporting time as the trigger event. The maximum reporting time enables the V2X/ProSe Application Layer, Application Function, LCS client and home gateway mobile location center ("HGMLC") to remain aware of continuing support by the UE for the area event (e.g., to detect if area event reporting may have been aborted due to UE power off).

Periodic Relative Location: This event is based on a configured periodic timer by the network or UE and expires in the UE that activates the transmission of relative location report between a pair of UEs or multiple pairs of UEs. If a periodic event is detected by the UE but an event report cannot be sent (e.g., because the UE cannot access the network temporarily), a deferred relative location report can be transmitted a later stage and the periodic timer for the next event shall then be started. The reporting duration for periodic location shall equal the requested number of reports multiplied by the periodic interval even when reports are delayed.

Tracking/Motion: An event where the responder UE deviates from a predefined straight-line distance from a previous location relative to the initiator UE.

In another embodiment, the responder UE may deviate from a set of predefined motions, e.g., moving along a curved arc, changing altitudes based on certain height thresholds, and/or the like. The motion event may be reported one time only, or multiple times.

The motion event report shall contain an indication of the event occurrence. A location estimate may be included in the report if requested by the V2X/ProSe Application Layer, LCS client, or Application Function.

For successive motion event reports, motion is determined relative to the initiator UE location corresponding to the immediately preceding event report (including an event report triggered by expiration of the maximum reporting time). If a motion event is detected by the initiator UE but an event report is deferred (e.g., because the UE cannot access the network temporarily), a report shall be sent later, when possible, irrespective of whether the motion event still applies to the current UE location.

Motion reporting is controlled by a minimum and a maximum reporting time. The minimum reporting time defines the minimum allowed time between successive event reports. The maximum reporting time defines the maximum time between successive reports. When a responder UE sends a report to the initiator UE due to expiration of the maximum reporting time, the responder UE indicates expiration of the maximum reporting time as the trigger event. The maximum reporting time enables the V2X/ProSe Application Layer, application function, LCS client, and HGMLC to remain aware of continuing support by the UE for the motion event (e.g., to detect if motion event reporting may have been aborted due to UE power off).

In another implementation, NI-RR, MT-RR, or MO-RR may also include both absolute and relative location information as part of the ranging request.

Figure 8A:
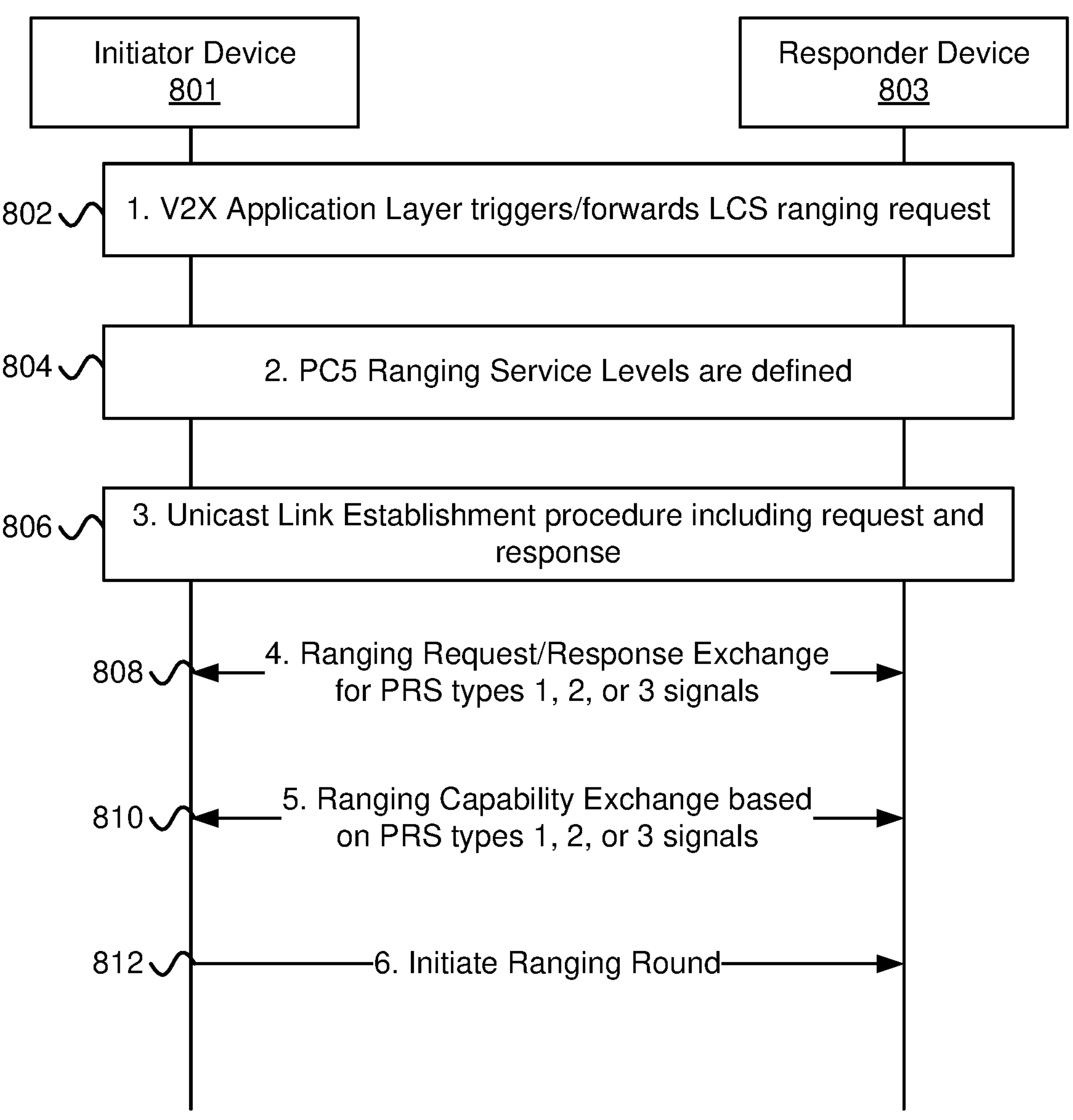
FIG. 8A is a diagram illustrating one embodiment of setup activities for unicast ranging.

In a second embodiment, directed to ranging setup procedures, FIG. 8A depicts one embodiment of the setup procedures required to enable one or more combinations of PRS Type 1, PRS Type 2, and/or PRS Type 3 ranging signals for a pair of UEs in a unicast fashion. FIG. 8A considers the V2X application layer; however, this may be equally applicable to the ProSe application layer as well.

As shown in FIG. 8A, at step 1 (see block 802), in one embodiment, the V2X/ProSe Application Layer can enable/disable ranging in a device via a triggered unicast LCS Ranging Request. This can be triggered by an LCS Client residing in the core network ("CN") or within the device or an Application Function ("AF"). The LMF can forward the request to the V2X/ProSe Application Layer in the case that the LCS Client resides in the Core Network to enable relative positioning via a triggered request. The ranging or relative location information request can either be NI-RR, MT-RR or MO-RR as described above. Furthermore, such type of requests can either be I-RR or D-RR.

In one embodiment, at step 2 (see block 804), the ranging service levels are mapped based on the triggered relative ranging requests or defined if not available according to V2X/ProSe Application Layer requirements. An exemplary illustration of the service requirements may be shown in Table 6. This information is conveyed to the lower layers to provide further details on the ranging requirements. In other implementations, the direction accuracy of the ranging service level can be expressed as radians.

TABLE 6

Ranging Service Levels for UE ranging

| Ranging Service | Relative Distance Accuracy (cm) | | Direction Accuracy (degrees) | | Ranging Latency |
|---|---|---|---|---|---|
| Level (RSL) | Horizontal | Vertical | Elevation | Azimuth | (ms) |
| 1 | 10 | 10 | ±2° | ±2° | 10 |
| 2 | 20 | 20 | ±4° | ±2° | 20 |
| . . . | . . . | . . . | . . . | . . . | . . . |
| N | r | z | ±α | ±θ° | t |

In one embodiment, at step 3 (see block 806) the initiator UE 801 and the responder UE 803 may use the unicast SL establishment procedures to create a link between the pair of UEs (Initiator 801 and Responder 803 Device). The responder device 803 can determine the destination layer-2 IDs for receiving the unicast transmission.

In one embodiment, at step 4 (see messaging 808) a ranging request and response signaling exchange may also be initiated by the initiator UE 801, where the initiator UE 801 transmits the request for ranging and the responder UE 803 transmits the response signaling for accepting or rejecting the ranging request. This can be signaled via PC5 RRC or PC5-S signaling. In another implementation, the capability information may also be transmitted along with the ranging request and response signaling exchange messages.

In one embodiment, at step 5 (see messaging 810) a ranging capability exchange may be initiated.

In one embodiment, at step 6 (see messaging 812) the ranging round is initiated in the lower layers.

Figure 8B:
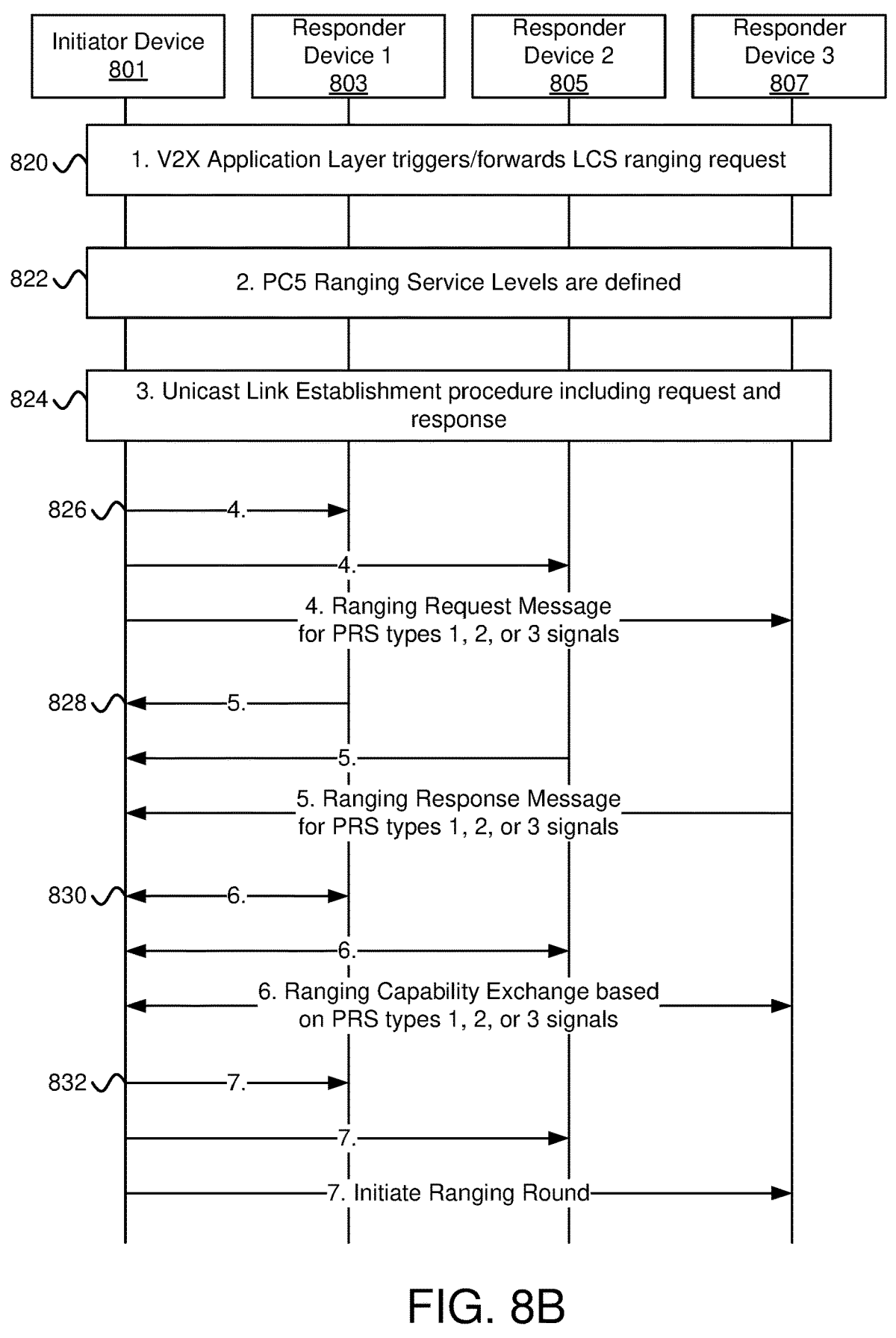

In one embodiment, shown in FIG. 8B, similar to unicast ranging, an initiator UE 801 may trigger (see blocks 820, 822, 824) the ranging procedures (see messaging 826, 828, 830, 832) in a groupcast fashion to multiple responder devices 803, 805, 807 within a group, which has already been defined or identified by the V2X/ProSe Application Layer, Application Function, or LCS Client (internal or external). The same procedures may apply for any member of the group wishing to initiate a ranging procedure. FIG. 8B is an overview of the setup procedures required to enable one or more combination of PRS Type 1, PRS Type 2, or PRS Type 3 ranging signals for a pair of UEs within a group in groupcast fashion.

In one embodiment, broadcast setup procedures can extend from a groupcast whereby multiple N initiator devices 801 may be involved in a ranging session with M responder devices 803, where N and M are the amount of initiator 801 and responder 803 devices, respectively, based on a ranging LCS request. In addition, in one embodiment, there is no group defined as with the case in groupcast ranging setup procedures.

Figure 9:
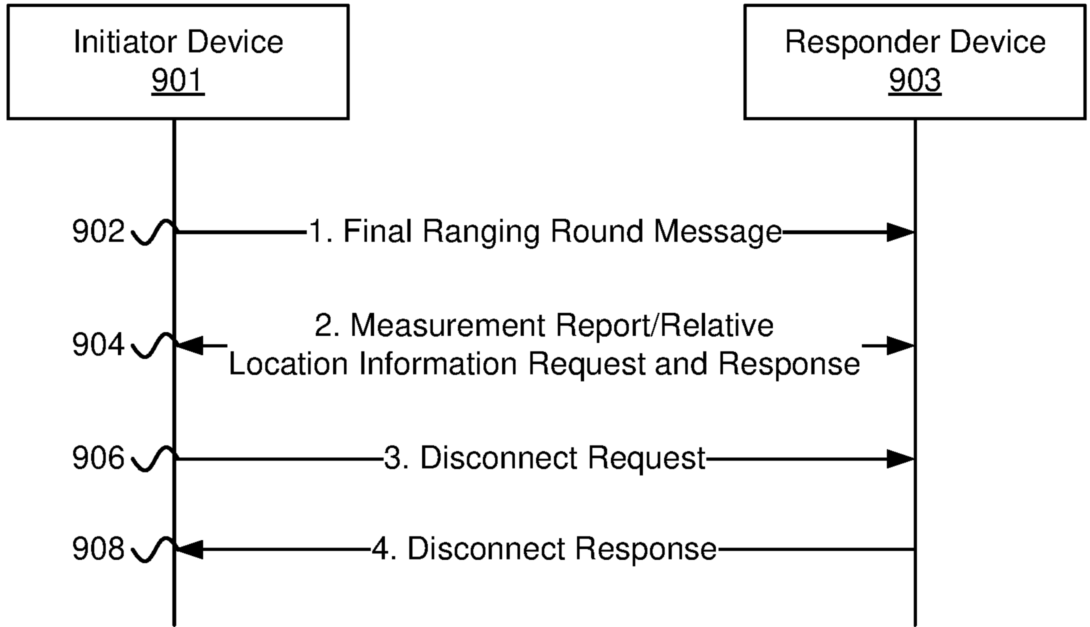
FIG. 9 is a diagram illustrating one embodiment of closing procedures for a unicast ranging session.

A third embodiment covers the ranging closing procedures after the completion of the ranging phase between an initiator and responder device. A set of messages are signaled to the responder device to initiate the wrap up of a ranging session. FIG. 9 shows the procedures required to close a unicast ranging session.

In one embodiment, at step 1 (see messaging 902) the initiator device 901 transmits a final ranging round message to the responder device 903 indicating the end of the ranging round. In some implementations, this message can indicate that a final ranging reply message is expected from the responder UE 903.

In one embodiment, at step 2 (see messaging 904) after the completion of the ranging phase, the initiator device 901 or the responder device 903 may trigger a request for a measurement report depending on the configured ranging method.

In one embodiment, at step 3 (see messaging 906) the initiator device 901 transmits a disconnect request message to the responder UE 903.

In one embodiment, at step 4 (see messaging 908) the responder device 903 transmits a disconnect response message to the initiator UE 901.

Figure 10:
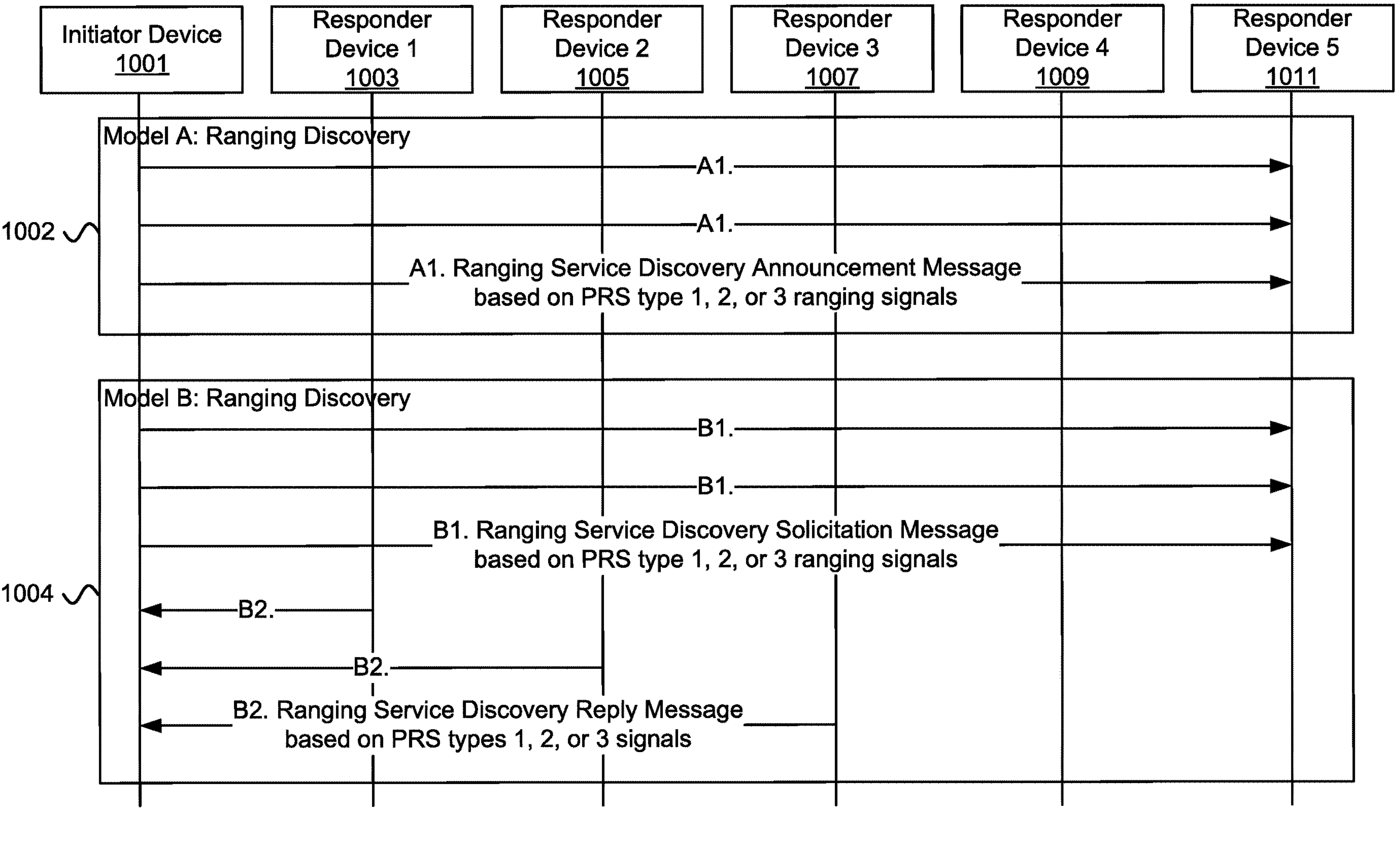
FIG. 10 is a diagram illustrating one embodiment of Model A and Model B ranging discovery messages.

A fourth embodiment describes the SL direct discovery methods for performing ranging between a pair of devices or multiple pair of devices in a group, which can follow the two types of discovery models, as shown in FIG. 10.

In a first model, model A 1002, ranging discovery comprises the initiator device 1001 and responder devices 1003-1011, where the:

a. Initiator device 1001 announces the ranging service information that could be used by responder devices 1003-1011 within proximity that have permission for ranging discovery.
b. Responder devices 1003-1011 monitor the ranging service information of interest.
c. In this model, the initiator device 1001 broadcasts discovery ranging request messages at predefined discovery intervals and the responder devices 1003-1011 that are interested in these messages may initiate a corresponding ranging session with the initiator device 1001 or act as a one of the responder devices 1003-1011 for the initiator UE 1001 to establish a ranging session.
d. In one embodiment, this is a form of open discovery and a response can be provided by any of the responder devices 1003-1011 to be involved in a ranging session.

In a second model, model B 1004, ranging discovery comprises the initiator device 1001 and responder devices 1003-1011, where the:

a. Initiator device 1001 transmits a ranging service request containing certain information relating to which responder device 1003-1011 the initiator device 1001 is interested to perform ranging using PRS Type 1 and/or PRS Type 2 signals.
b. Responder devices 1003-1011 receive the ranging service request and may reply to the initiator device 1001 accepting or rejecting the request.

c. In one embodiment, this method of discovery can enable dynamic groups for ranging purposes as opposed to ranging group management in the application layer.

d. In one embodiment, this is also a form of restricted group member discovery intended for certain responder devices to be involved in a ranging session.

Figure 11:
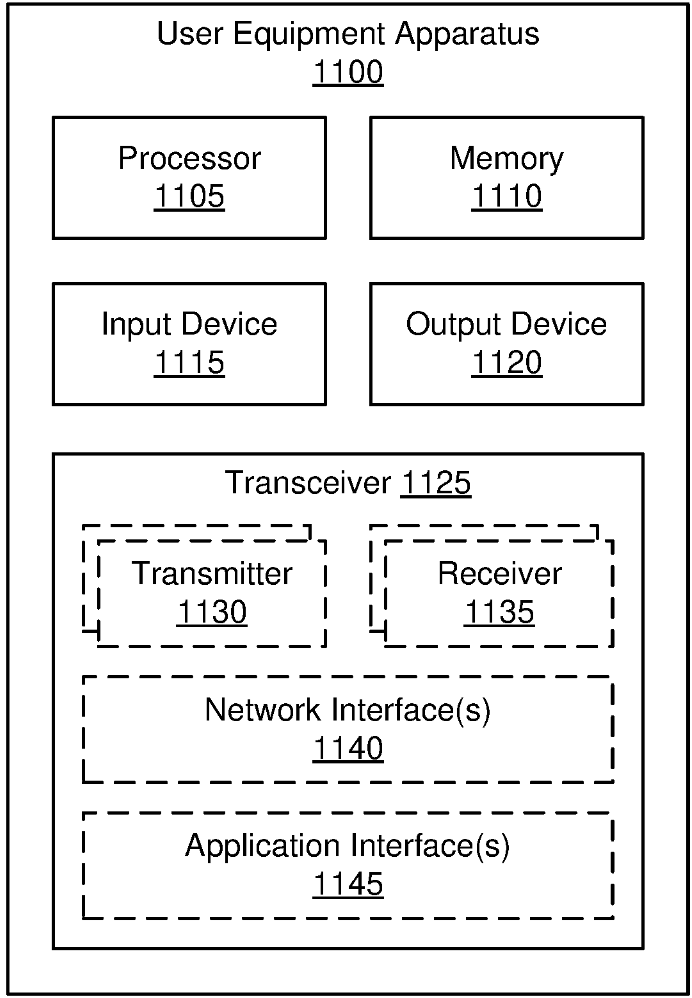
FIG. 11 is a block diagram illustrating one embodiment of a user equipment apparatus that may be used for sidelink ranging for positioning reference signal types.

FIG. 11 depicts a user equipment apparatus 1100 that may be used for sidelink ranging for positioning reference signal types, according to embodiments of the disclosure. In various embodiments, the user equipment apparatus 1100 is used to implement one or more of the solutions described above. The user equipment apparatus 1100 may be one embodiment of the remote unit 105 and/or the UE 205, described above. Furthermore, the user equipment apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the user equipment apparatus 1100 may not include any input device 1115 and/or output device 1120. In various embodiments, the user equipment apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. In some embodiments, the transceiver 1125 communicates with one or more cells (or wireless coverage areas) supported by one or more base units 121. In various embodiments, the transceiver 1125 is operable on unlicensed spectrum. Moreover, the transceiver 1125 may include multiple UE panels supporting one or more beams. Additionally, the transceiver 1125 may support at least one network interface 1140 and/or application interface 1145. The application interface(s) 1145 may support one or more APIs. The network interface(s) 1140 may support 3GPP reference points, such as Uu, N1, PC5, etc. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the processor 1105 controls the user equipment apparatus 1100 to implement the above-described UE behaviors. In certain embodiments, the processor 1105 may include an application processor (also known as "main processor") which manages application-domain and operating system ("OS") functions and a baseband processor (also known as "baseband radio processor") which manages radio functions.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to sidelink ranging for positioning reference signal types. For example, the memory 1110 may store various parameters, panel/beam configurations, resource assignments, policies, and the like as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1120 may include a wearable display separate from, but communicatively coupled to, the rest of the user equipment apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all, or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 communicates with one or more network functions of a mobile communication network via one or more access networks. The transceiver 1125 operates under the control of the processor 1105 to transmit messages, data, and other signals and to receive messages, data, and other signals. For example, the processor 1105 may selectively activate the transceiver 1125 (or portions thereof) at times to send and receive messages.

The transceiver 1125 includes at least transmitter 1130 and at least one receiver 1135. One or more transmitters 1130 may be used to provide UL communication signals to a base unit 121, such as the UL transmissions described herein. Similarly, one or more receivers 1135 may be used to receive DL communication signals from the base unit 121, as described herein. Although only one transmitter 1130 and one receiver 1135 are illustrated, the user equipment apparatus 1100 may have any suitable number of transmitters 1130 and receivers 1135. Further, the transmitter(s) 1130 and the receiver(s) 1135 may be any suitable type of transmitters and receivers. In one embodiment, the transceiver 1125 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1125, transmitters 1130, and receivers 1135 may be implemented as physically separate components that access a shared hardware resource and/or software resource, such as for example, the network interface 1140.

In various embodiments, one or more transmitters 1130 and/or one or more receivers 1135 may be implemented and/or integrated into a single hardware component, such as a multi transceiver chip, a system-on-a-chip, an Application-Specific Integrated Circuit ("ASIC"), or other type of hardware component. In certain embodiments, one or more transmitters 1130 and/or one or more receivers 1135 may be implemented and/or integrated into a multi-chip module. In some embodiments, other components such as the network interface 1140 or other hardware components/circuits may be integrated with any number of transmitters 1130 and/or receivers 1135 into a single chip. In such embodiment, the transmitters 1130 and receivers 1135 may be logically configured as a transceiver 1125 that uses one more common control signals or as modular transmitters 1130 and receivers 1135 implemented in the same hardware chip or in a multi-chip module.

In one embodiment, the transceiver 1125 receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the processor 1105 initiates the sidelink ranging session with the responder device in response to receiving a confirmation that the responder device will participate in the sidelink ranging session and determines completion of the sidelink ranging session with the responder device. In one embodiment, the transceiver 1125 transmits, to the responder device, a final ranging round message to the responder device indicating a final round of the sidelink ranging session and receives, from the responder device, a location measurement report in response to the final ranging round message.

In one embodiment, the ranging request comprises one of a network induced ranging request, a mobile terminated ranging request, and a mobile originated ranging request.

In one embodiment, the ranging request is based on one of an immediate ranging request and a deferred ranging request.

In one embodiment, the deferred ranging request is triggered in response to an event, the event comprising one or more of a coverage area event, a periodic relative location event, and a tracking motion event.

In one embodiment, performing ranging setup comprises performing a sidelink unicast ranging setup based on a defined set of ranging service levels.

In one embodiment, the capability information may be transmitted along with the ranging request and response messages.

In one embodiment, the set of ranging service levels may comprise an index of ranging service levels associated to at least one of a positioning accuracy, a direction accuracy, and a ranging latency.

In one embodiment, performing ranging setup comprises performing a sidelink groupcast ranging setup based on a defined set of ranging service levels.

In one embodiment, performing ranging setup comprises performing a sidelink broadcast ranging setup based on a defined set of ranging service levels.

In one embodiment, the transceiver 1125 transmits a ranging discovery message to a plurality of responder devices to initiate a sidelink ranging session with the plurality of responder devices.

In one embodiment, the transceiver 1125 transmits a sidelink ranging service discovery announcement message to the plurality of responder devices.

In one embodiment, the transceiver 1125 transmits a sidelink ranging service discovery solicitation message to the plurality of responder devices.

In one embodiment, the transceiver 1125 receives a sidelink ranging service discovery response message to the initiator device from one or more of the plurality of responder devices.

In one embodiment, the transceiver 1125 receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the processor 1105 participates in the sidelink ranging session with the initiator device. In one embodiment, the transceiver 1125 receives, from the initiator device, a final ranging round message indicating a final round of the sidelink ranging session and transmits, to the initiator device, a location measurement report in response to the final ranging round message.

Figure 12:
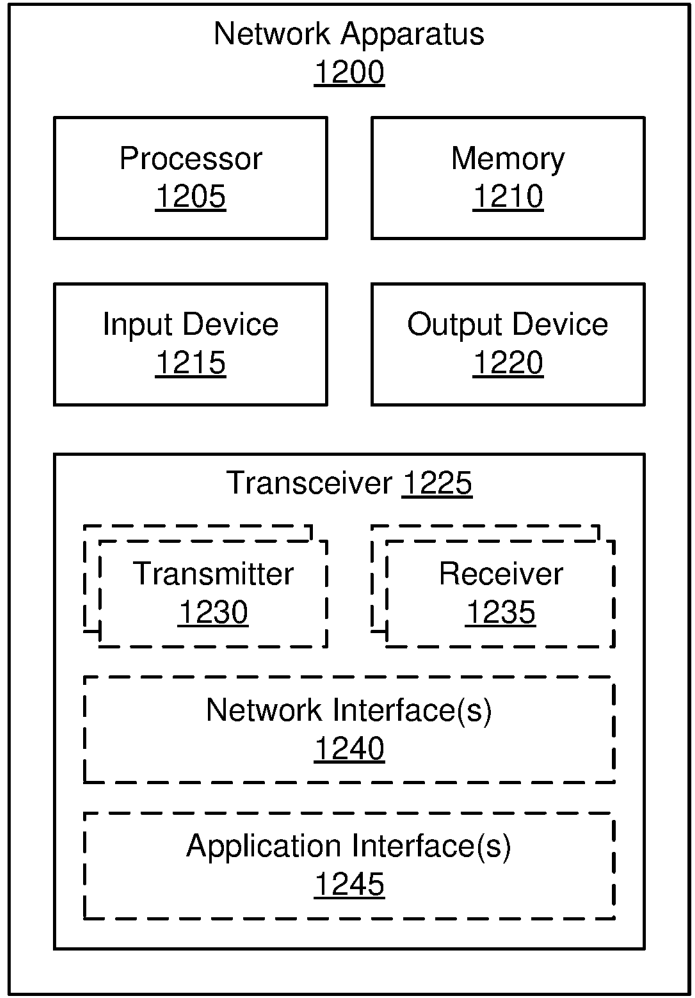
FIG. 12 is a block diagram illustrating one embodiment of a network equipment apparatus that may be used for sidelink ranging for positioning reference signal types.

FIG. 12 depicts a network apparatus 1200 that may be used for sidelink ranging for positioning reference signal types, according to embodiments of the disclosure. In one embodiment, network apparatus 1200 may be one implementation of a RAN node, such as the base unit 121 and/or the RAN node 210, as described above. Furthermore, the base network apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the network apparatus 1200 may not include any input device 1215 and/or output device 1220. In various embodiments, the network apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more remote units 175. Additionally, the transceiver 1225 may support at least one network interface 1240 and/or application interface 1245. The application interface(s) 1245 may support one or more APIs. The network interface(s) 1240 may support 3GPP reference points, such as Uu, N1, N2 and N3. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a CPU, a GPU, an auxiliary processing unit, a FPGA, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the network apparatus 1200 is a RAN node (e.g., gNB) that communicates with one or more UEs, as described herein. In such embodiments, the processor 1205 controls the network apparatus 1200 to perform the above-described RAN behaviors. When operating as a RAN node, the processor 1205 may include an application processor (also known as "main processor") which manages application-domain and operating system ("OS") functions and a baseband processor (also known as "baseband radio processor") which manages radio functions.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to sidelink ranging for positioning reference signal types. For example, the memory 1210 may store parameters, configurations, resource assignments, policies, and the like, as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the network apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. One or more transmitters 1230 may be used to communicate with the UE, as described herein. Similarly, one or more receivers 1235 may be used to communicate with network functions in the PLMN and/or RAN, as described herein. Although only one transmitter 1230 and one receiver 1235 are illustrated, the network apparatus 1200 may have any suitable number of transmitters 1230 and receivers 1235. Further, the transmitter(s) 1230 and the receiver(s) 1235 may be any suitable type of transmitters and receivers.

In one embodiment, the transceiver 1225 receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the processor 1205 initiates the sidelink ranging session with the responder device in response to receiving a confirmation that the responder device will participate in the sidelink ranging session and determines completion of the sidelink ranging session with the responder device. In one to embodiment, the transceiver 1225 transmits, to the responder device, a final ranging round message to the responder device indicating a final round of the sidelink ranging session and receives, from the responder device, a location measurement report in response to the final ranging round message.

In one embodiment, the ranging request comprises one of a network induced ranging request, a mobile terminated ranging request, and a mobile originated ranging request.

In one embodiment, the ranging request is based on one of an immediate ranging request and a deferred ranging request.

In one embodiment, the deferred ranging request is triggered in response to an event, the event comprising one or more of a coverage area event, a periodic relative location event, and a tracking motion event.

In one embodiment, performing ranging setup comprises performing a sidelink unicast ranging setup based on a defined set of ranging service levels.

In one embodiment, the capability information may be transmitted along with the ranging request and response messages.

In one embodiment, the set of ranging service levels may comprise an index of ranging service levels associated to at least one of a positioning accuracy, a direction accuracy, and a ranging latency.

In one embodiment, performing ranging setup comprises performing a sidelink groupcast ranging setup based on a defined set of ranging service levels.

In one embodiment, performing ranging setup comprises performing a sidelink broadcast ranging setup based on a defined set of ranging service levels.

In one embodiment, the transceiver 1225 transmits a ranging discovery message to a plurality of responder devices to initiate a sidelink ranging session with the plurality of responder devices.

In one embodiment, the transceiver 1225 transmits a sidelink ranging service discovery announcement message to the plurality of responder devices.

In one embodiment, the transceiver 1225 transmits a sidelink ranging service discovery solicitation message to the plurality of responder devices.

In one embodiment, the transceiver 1225 receives a sidelink ranging service discovery response message to the initiator device from one or more of the plurality of responder devices.

In one embodiment, the transceiver 1225 receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the processor 1205 participates in the sidelink ranging session with the initiator device. In one embodiment, the transceiver 1225 receives, from the initiator device, a final ranging round message indicating a final round of the sidelink ranging session and transmits, to the initiator device, a location measurement report in response to the final ranging round message.

Figure 13:
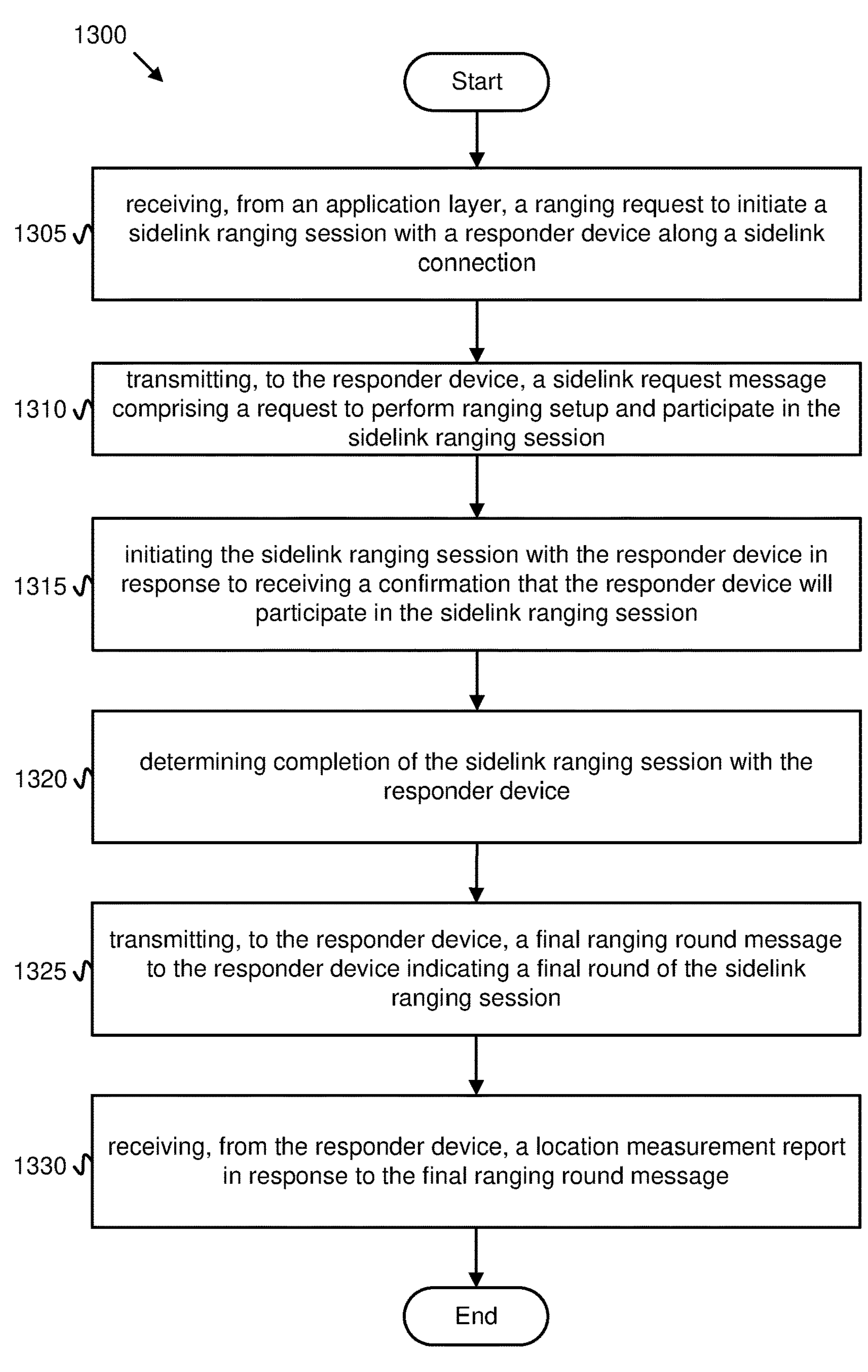
FIG. 13 is a block diagram illustrating one embodiment of a first method for sidelink ranging for positioning reference signal types.

FIG. 13 depicts one embodiment of a method 1300 for sidelink ranging for positioning reference signal types, according to embodiments of the disclosure. In various embodiments, the method 1300 is performed by a user equipment device in a mobile communication network, such as the remote unit 105, the UE 205, and/or the user equipment apparatus 1100, described above, and/or a network equipment apparatus 1200, such as base unit 121. In some embodiments, the method 1300 is performed by a processor, such as a microcontroller, a microprocessor, a CPU, a GPU, an auxiliary processing unit, a FPGA, or the like.

In one embodiment, the method 1300 begins and receives 1305, from an application layer, a ranging request to initiate a sidelink ranging session with a responder device along a sidelink connection. In one embodiment, the method 1300 transmits 1310, to the responder device, a sidelink request message comprising a request to perform ranging setup and participate in the sidelink ranging session. In one embodiment, the method 1300 initiates 1315 the sidelink ranging session with the responder device in response to receiving a confirmation that the responder device will participate in the sidelink ranging session. In one embodiment, the method 1300 determines 1320 completion of the sidelink ranging session with the responder device. In one embodiment, the method 1300 transmits 1325, to the responder device, a final ranging round message to the responder device indicating a final round of the sidelink ranging session. In one embodiment, the method 1300 receives 1330, from the responder device, a location measurement report in response to the final ranging round message. The method 1300 ends.

Figure 14:
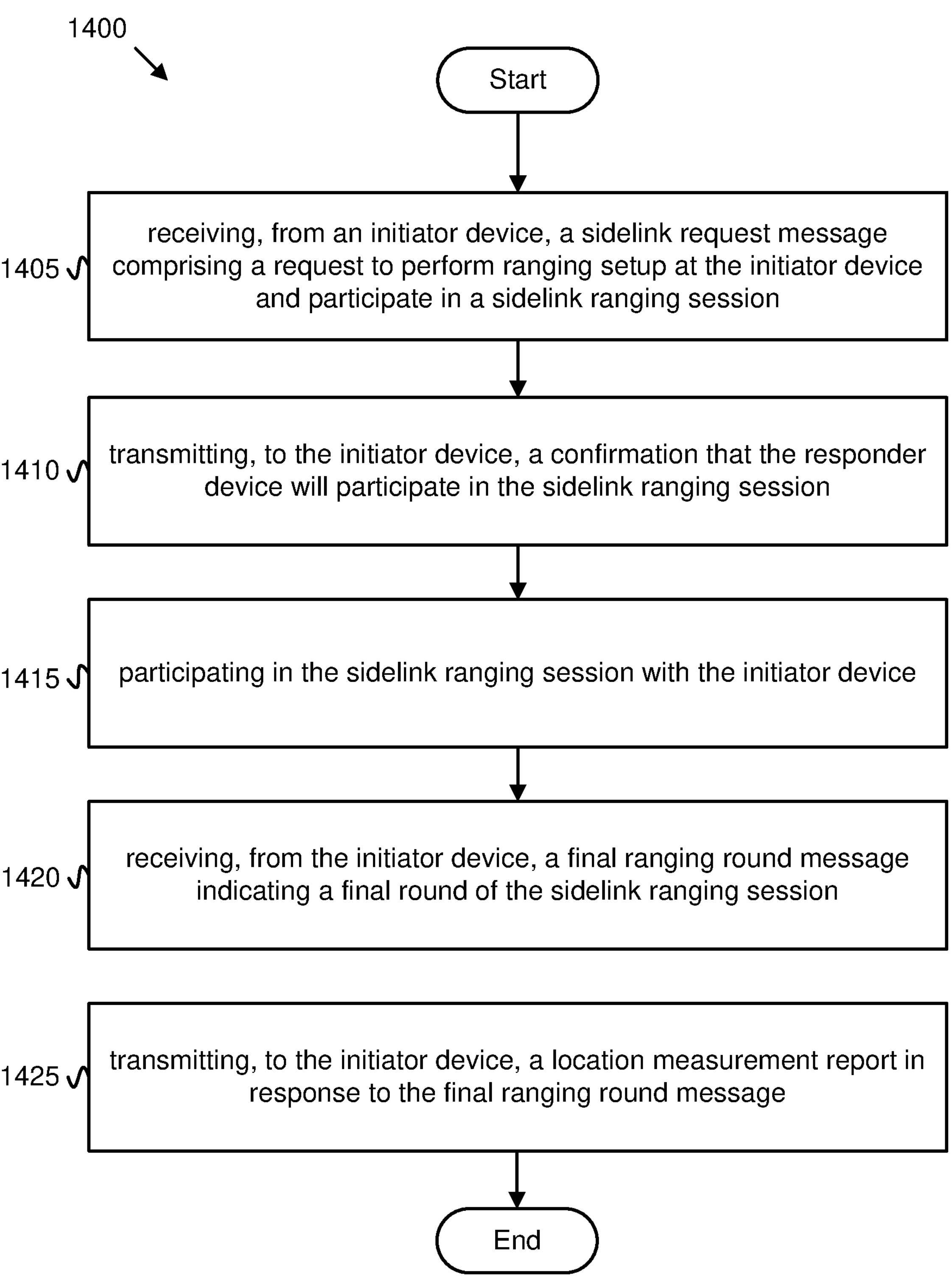
FIG. 14 is a block diagram illustrating one embodiment of a second method for sidelink ranging for positioning reference signal types.

FIG. 14 depicts one embodiment of a method 1400 for sidelink ranging for positioning reference signal types, according to embodiments of the disclosure. In various embodiments, the method 1400 is performed by a user equipment device in a mobile communication network, such as the remote unit 105, the UE 205, and/or the user equipment apparatus 1100, described above, and/or a network equipment apparatus 1200, such as base unit 121. In some embodiments, the method 1700 is performed by a processor, such as a microcontroller, a microprocessor, a CPU, a GPU, an auxiliary processing unit, a FPGA, or the like.

In one embodiment, the method 1400 begins and receives 1405, from an initiator device, a sidelink request message comprising a request to perform ranging setup at the initiator device and participate in a sidelink ranging session. In one embodiment, the method 1400 transmits 1410, to the initiator device, a confirmation that the responder device will participate in the sidelink ranging session. In one embodiment, the method 1400 participates 1415 in the sidelink ranging session with the initiator device. In one embodiment, the method 1400 receives 1420, from the initiator device, a final ranging round message indicating a final round of the sidelink ranging session. In one embodiment, the method 1400 transmits 1425, to the initiator device, a location measurement report in response to the final ranging round message. The method 1400 ends.

Disclosed herein is a first apparatus for sidelink ranging for positioning reference signal types, according to embodiments of the disclosure. The first apparatus may be implemented by a user equipment device in a mobile communication network, such as the remote unit 105, the UE 205, and/or the user equipment apparatus 1100, described above, and/or a network equipment apparatus 1200, such as base unit 121. In one embodiment, the first apparatus is implemented by a processor, such as a microcontroller, a microprocessor, a CPU, a GPU, an auxiliary processing unit, a FPGA, or the like.

In one embodiment, the first apparatus includes a transceiver that receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the first apparatus includes a processor that initiates the sidelink ranging session with the responder device in response to receiving a confirmation that the responder device will participate in the sidelink ranging session and determines completion of the sidelink ranging session with the responder device. In one embodiment, the transceiver transmits, to the responder device, a final ranging round message to the responder device indicating a final round of the sidelink ranging session and receives, from the responder device, a location measurement report in response to the final ranging round message.

In one embodiment, the ranging request comprises one of a network induced ranging request, a mobile terminated ranging request, and a mobile originated ranging request.

In one embodiment, the ranging request is based on one of an immediate ranging request and a deferred ranging request.

In one embodiment, the deferred ranging request is triggered in response to an event, the event comprising one or more of a coverage area event, a periodic relative location event, and a tracking motion event.

In one embodiment, performing ranging setup comprises performing a sidelink unicast ranging setup based on a defined set of ranging service levels.

In one embodiment, the capability information may be transmitted along with the ranging request and response messages.

In one embodiment, the set of ranging service levels may comprise an index of ranging service levels associated to at least one of a positioning accuracy, a direction accuracy, and a ranging latency.

In one embodiment, performing ranging setup comprises performing a sidelink groupcast ranging setup based on a defined set of ranging service levels.

In one embodiment, performing ranging setup comprises performing a sidelink broadcast ranging setup based on a defined set of ranging service levels.

In one embodiment, the transceiver transmits a ranging discovery message to a plurality of responder devices to initiate a sidelink ranging session with the plurality of responder devices.

In one embodiment, the transceiver transmits a sidelink ranging service discovery announcement message to the plurality of responder devices.

In one embodiment, the transceiver transmits a sidelink ranging service discovery solicitation message to the plurality of responder devices.

In one embodiment, the transceiver receives a sidelink ranging service discovery response message to the initiator device from one or more of the plurality of responder devices.

Disclosed herein is a first method for sidelink ranging for positioning reference signal types, according to embodiments of the disclosure. The first method is performed by a user equipment device in a mobile communication network, such as the remote unit 105, the UE 205, and/or the user equipment apparatus 1100, described above, and/or a network equipment apparatus 1200, such as base unit 121. In some embodiments, the first method is performed by a processor, such as a microcontroller, a microprocessor, a CPU, a GPU, an auxiliary processing unit, a FPGA, or the like.

In one embodiment, the first method receives, from an application layer, a ranging request to initiate a sidelink ranging session with a responder device along a sidelink connection and transmits, to the responder device, a sidelink request message comprising a request to perform ranging setup and participate in the sidelink ranging session. In one embodiment, the first method initiates the sidelink ranging session with the responder device in response to receiving a confirmation that the responder device will participate in the sidelink ranging session and determines completion of the sidelink ranging session with the responder device. In one embodiment, the first method transmits, to the responder device, a final ranging round message to the responder device indicating a final round of the sidelink ranging session and receives, from the responder device, a location measurement report in response to the final ranging round message.

In one embodiment, the ranging request comprises one of a network induced ranging request, a mobile terminated ranging request, and a mobile originated ranging request.

In one embodiment, the ranging request is based on one of an immediate ranging request and a deferred ranging request.

In one embodiment, the deferred ranging request is triggered in response to an event, the event comprising one or more of a coverage area event, a periodic relative location event, and a tracking motion event.

In one embodiment, performing ranging setup comprises performing a sidelink unicast ranging setup based on a defined set of ranging service levels.

In one embodiment, the capability information may be transmitted along with the ranging request and response messages.

In one embodiment, the set of ranging service levels may comprise an index of ranging service levels associated to at least one of a positioning accuracy, a direction accuracy, and a ranging latency.

In one embodiment, performing ranging setup comprises performing a sidelink groupcast ranging setup based on a defined set of ranging service levels.

In one embodiment, performing ranging setup comprises performing a sidelink broadcast ranging setup based on a defined set of ranging service levels.

In one embodiment, the first method transmits a ranging discovery message to a plurality of responder devices to initiate a sidelink ranging session with the plurality of responder devices.

In one embodiment, the first method transmits a sidelink ranging service discovery announcement message to the plurality of responder devices.

In one embodiment, the first method transmits a sidelink ranging service discovery solicitation message to the plurality of responder devices.

In one embodiment, the first method receives a sidelink ranging service discovery response message to the initiator device from one or more of the plurality of responder devices.

Disclosed herein is a second apparatus for sidelink ranging for positioning reference signal types, according to embodiments of the disclosure. The second apparatus may be implemented by a user equipment device in a mobile communication network, such as the remote unit 105, the UE 205, and/or the user equipment apparatus 1100, described above, and/or a network equipment apparatus 1200, such as base unit 121. In one embodiment, the second apparatus is implemented by a processor, such as a microcontroller, a microprocessor, a CPU, a GPU, an auxiliary processing unit, a FPGA, or the like.

In one embodiment, the second apparatus includes a transceiver that receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the second apparatus includes a processor that participates in the sidelink ranging session with the initiator device. In one embodiment, the transceiver receives, from the initiator device, a final ranging round message indicating a final round of the sidelink ranging session and transmits, to the initiator device, a location measurement report in response to the final ranging round message.

Disclosed herein is a second method for sidelink ranging for positioning reference signal types, according to embodiments of the disclosure. The second method is performed by a user equipment device in a mobile communication network, such as the remote unit 105, the UE 205, and/or the user equipment apparatus 1100, described above, and/or a network equipment apparatus 1200, such as base unit 121. In some embodiments, the second method is performed by a processor, such as a microcontroller, a microprocessor, a CPU, a GPU, an auxiliary processing unit, a FPGA, or the like.

In one embodiment, the second method receives, from an initiator device, a sidelink request message comprising a request to perform ranging setup at the initiator device and participate in a sidelink ranging session and transmits, to the initiator device, a confirmation that the responder device will participate in the sidelink ranging session. In one embodiment, the second method participates in the sidelink ranging session with the initiator device. In one embodiment, the second method receives, from the initiator device, a final ranging round message indicating a final round of the sidelink ranging session and transmits, to the initiator device, a location measurement report in response to the final ranging round message.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
- at least one memory; and
- at least one processor coupled with the at least one memory and configured to cause the UE to:
  - receive a ranging request associated with a sidelink ranging session of a sidelink connection;
  - transmit a sidelink request message comprising a request for ranging setup and participation in the sidelink ranging session;
  - receive confirmation for participation in the sidelink ranging session in response to the sidelink request message;
  - initiate the sidelink ranging session in response to the confirmation; and
  - determine completion of the sidelink ranging session.

2. The UE of claim 1, wherein the ranging request comprises a network induced ranging request, a mobile terminated ranging request, a mobile originated ranging request, or a combination thereof.

3. The UE of claim 2, wherein the ranging request is based on an immediate ranging request, a deferred ranging request, or a combination thereof.

4. The UE of claim 3, wherein the deferred ranging request is triggered in response to an event, the event comprising a coverage area event, a periodic relative location event, a tracking motion event, or a combination thereof.

5. The UE of claim 1, wherein performing ranging setup comprises performing a sidelink unicast ranging setup based on a set of ranging service levels.

6. The UE of claim 1, wherein the at least one processor is configured to cause the UE to transmit capability information with the ranging request and response messages.

7. The UE of claim 5, wherein the set of ranging service levels comprises an index of ranging service levels associated to a positioning accuracy, a direction accuracy, a ranging latency, or a combination thereof.

8. The UE of claim 1, wherein performing ranging setup comprises performing a sidelink groupcast ranging setup based on a set of ranging service levels.

9. The UE of claim 1, wherein performing ranging setup comprises performing a sidelink broadcast ranging setup based on a set of ranging service levels.

10. The UE of claim 1, wherein the at least one processor is configured to cause the UE to transmit a ranging discovery message to a plurality of devices to initiate a sidelink ranging session with the plurality of devices.

11. The UE of claim 10, wherein the at least one processor is configured to cause the UE to transmit a sidelink ranging service discovery announcement message to the plurality of devices.

12. The UE of claim 11, wherein the at least one processor is configured to cause the UE to transmit a sidelink ranging service discovery solicitation message to the plurality of devices.

13. The UE of claim 11, wherein the at least one processor is configured to cause the UE to receive a sidelink ranging service discovery response message from one or more of the plurality of devices.

14. A method for wireless communication performed by a user equipment (UE), the method comprising:
- receiving a sidelink request message comprising a request for ranging setup and participation in a sidelink ranging session;
- transmitting a confirmation for participation in the sidelink ranging session; and
- participating in the sidelink ranging session.

15. An equipment (UE) for wireless communication, comprising:
- at least one memory; and
- at least one processor coupled with the at least one memory and configured to cause the UE to:
  - receive a sidelink request message comprising a request for ranging setup and participation in a sidelink ranging session;
  - transmit a confirmation to participate in the sidelink ranging session in response to the sidelink request message; and
  - participate in the sidelink ranging session.

16. A method for wireless communication performed by a user equipment (UE), the method comprising:
- receiving a ranging request associated with a sidelink ranging session of a sidelink connection;
- transmitting a sidelink request message comprising a request for ranging setup and participation in the sidelink ranging session in response to the ranging request;
- receiving confirmation for participation in the sidelink ranging session in response to the sidelink request message;
- initiating the sidelink ranging session in response to the confirmation; and
- determining completion of the sidelink ranging session.

17. The method of claim 16, wherein the ranging request comprises a network induced ranging request, a mobile terminated ranging request, a mobile originated ranging request, or a combination thereof.

18. The method of claim 17, wherein the ranging request is based on an immediate ranging request, a deferred ranging request, or a combination thereof.

19. The method of claim 18, wherein the deferred ranging request is triggered in response to an event, the event comprising a coverage area event, a periodic relative location event, a tracking motion event, or a combination thereof.

20. The method of claim 16, wherein the UE comprises an initiator UE.

* * * * *